(12) United States Patent
Miller

(10) Patent No.: US 7,493,191 B1
(45) Date of Patent: Feb. 17, 2009

(54) AUXILIARY CONTROL APPARATUS FOR MICRO-MANIPULATORS USED IN ULTRASONIC BONDING MACHINES

(76) Inventor: Charles F. Miller, 651 Pathfinder Trail, Anaheim Hills, CA (US) 92665

( * ) Notice: Subject to any disclaimer, the term of this patent is extended or adjusted under 35 U.S.C. 154(b) by 972 days.

(21) Appl. No.: 11/010,121

(22) Filed: Dec. 9, 2004

(51) Int. Cl.
*G06F 19/00* (2006.01)

(52) U.S. Cl. .................. 700/245; 700/247; 700/249; 228/1.1; 228/8; 228/9; 228/4.5; 228/110.1; 29/230 B; 29/624; 29/748

(58) Field of Classification Search .............. 700/245, 700/247, 249; 228/8, 1.1, 4.5, 110.1, 180.5, 228/45, 105, 102, 104, 47, 47.1, 6.2, 7; 29/203 B, 29/624, 748
See application file for complete search history.

(56) References Cited

U.S. PATENT DOCUMENTS

| | | | | |
|---|---|---|---|---|
| 4,073,424 A | * | 2/1978 | Kulicke et al. | 228/4.5 |
| 4,763,827 A | * | 8/1988 | Watanabe et al. | 228/102 |
| 5,456,403 A | * | 10/1995 | Nishimaki et al. | 228/102 |
| 5,458,280 A | * | 10/1995 | Nishimaki et al. | 228/102 |
| 5,474,224 A | * | 12/1995 | Nishimaki et al. | 228/102 |
| 5,566,876 A | * | 10/1996 | Nishimaki et al. | 228/102 |
| 5,702,049 A | * | 12/1997 | Biggs et al. | 228/105 |
| 5,871,136 A | * | 2/1999 | Miller | 228/4.5 |
| 5,894,983 A | * | 4/1999 | Beck et al. | 228/110.1 |
| 5,931,372 A | * | 8/1999 | Miller | 228/180.5 |
| 6,164,514 A | * | 12/2000 | Miller | 228/1.1 |
| 6,382,494 B1 | * | 5/2002 | Miller | 228/1.1 |

OTHER PUBLICATIONS

Abou-El-Ela et al., Fine motion control of robot manipulators in deburring applications utilizing cutting tool signals, 1996, IEEE, p. 86-91.*

Chen et al., Development of a novel parallel manipulator based machine tools, 2002, IEEE, p. 895-899.*

Langrock et al., Advanced telerobotic controller, 1994, IEEE, p. 157-162.*

* cited by examiner

*Primary Examiner*—Khoi H. Tran
*Assistant Examiner*—McDieunel Marc
(74) *Attorney, Agent, or Firm*—William L. Chapin

(57) ABSTRACT

An auxiliary control apparatus mechanically couples forces exerted on a manually operable auxiliary hand control knob to an input member of a micro-manipulator of the type used to move a point of an object such as an ultrasonic bonding tool tip relative to a workpiece in scaled ratios of motions at an end of the micro-manipulator input member. The apparatus includes a 4-bar parallelogram linkage which is mounted to a structural support member of a micro-manipulator, and which includes a rear laterally disposed lateral linkage bar pivotably connected to inner and outer parallel longitudinally disposed linkage bars which are pivotably coupled at front ends thereof to a front laterally disposed linkage bar. An input control arm protrudes downwardly from and forward of the outer longitudinal linkage bar, and a connector arm protrudes laterally inwardly from an inner end of the front lateral linkage bar, inwardly of the inner longitudinal linkage bar; the inner lateral end of the connector arm is pivotably connected to a forward end of the micro-manipulator input member. The rear lateral linkage bar is pivotably mounted onto a pivot axle which protrudes laterally outwards from a trolley block rollably mounted on a fore-and-aft disposed linear bearing guide rail mounted to an outer longitudinal surface of the support structure. Motions of the hand control knob in fore-and-aft left and right, and up and down directions cause corresponding motions of the micro-manipulator input control member and tool tip.

45 Claims, 13 Drawing Sheets

AUXILIARY CONTROL APPARATUS FOR MICRO-MANIPULATORS USED IN ULTRASONIC BONDING MACHINES

BACKGROUND OF THE INVENTION

A. Field of the Invention

The present invention relates generally to machines and apparatus for precisely positioning an ultrasonic bonding tool or similar implement relative to a workpiece. More particularly, the invention relates to ultrasonic bonding machines of the type which have a micro-manipulator apparatus that includes a manipulator input mechanism that is mechanically coupled to an output follower mechanism and which is responsive to motions of a hand control knob of the manipulator input mechanism in positioning the tip of a wire bonding tool at precisely determinable locations relative to a microcircuit or similar workpiece, moving the tool tip into contact with the workpiece where the tool is energized by ultrasonic energy and/or heat and pressure to bond a wire to a site on the workpiece, and retracting the tool tip from the bond site after making a bond. Specifically, the invention relates to an improvement in micro-manipulators for ultrasonic bonding machines which includes an auxiliary micro-manipulator control apparatus that is mechanically coupleable to the input control member of a micro-manipulator. The auxiliary control apparatus includes a motion control mechanism which has a manually operable input control arm. Motions of a hand control knob at the end of the input control arm mechanically cause motions of the input control member and tool of the micro-manipulator, and since the control arm is spaced laterally away from the input control member, using the apparatus expands useable lateral work space below the bonding tool of the machine.

B. Description of Background Art

A large variety of scientific procedures, medical procedures and industrial processes require the use of a type of apparatus referred to generally as a micro-manipulator for precisely positioning of a tip of a tool or instrument relative to a small workpiece or other such object. For example, the manufacture of electronic components such as integrated microcircuits requires the use of a micro-manipulator-type apparatus, for the following reasons.

Integrated circuits are fabricated from thin slices of a semi-conducting material such as silicon, germaninan, gallium arsenide, or other III-V compounds, i.e., compounds of elements from columns three and five of the periodic table. The slices are cut into small squares or rectangles referred to as chips or dice, ranging in size from squares about 100 mil (0.100 inch) on a side to several hundred mils. Transistors, diodes, resistors and interconnecting circuit paths are formed on each chip or die by diffusing impurities into selected regions of the die to produce a desired electrical conductivity. Various conducting paths and insulated layers are then deposited on the chip.

After a semi-conductor chip or die has been fabricated as described above, it must be attached to a base or carrier. A lid is then sealed to the base to form a package or container which protects the delicate die from damage. Prior to attaching the lid to the carrier which supports the die, conductive pads which provide input and output conductive paths to the die must be electrically interconnected to more robust leads or terminals which extend outward from the carrier. These interconnections are customarily made using fine aluminum or gold wires. Wires are ultrasonically bonded or thermosonically welded to bonding sites, such as die pads and external leads by a bonding tool which has a tapered tip that is moved downwardly to press a wire against a bonding site. Ultrasonic energy, or a combination of heat and ultrasonic energy, is then applied momentarily to the tool to bond the wire to the bonding site. Since the connection pads of a microcircuit are extremely tiny and closely spaced, great precision is required in positioning the tip of the bonding tool relative to the microcircuit.

Responsive to the need for an apparatus capable of precisely positioning the tip of an ultrasonic transducer-type bonding tool to form wire bonds on microcircuit chips, the present inventor invented a micro-positioner apparatus which employs a novel pantograph-type manipulator input mechanism. That apparatus, which was disclosed in the present inventor's U.S. Pat. No. 3,474,685 and issued on Oct. 28, 1969, has proven to be highly effective in performing its intended functions, and wire bonding machines employing the novel design concepts including the pantograph mechanism disclosed in that patent are widely used throughout the electronics industry. However, the present inventor found that certain aspects of the micro-positioner disclosed in the U.S. Pat. No. 3,474,685 patent might be improved upon. For example, the allowable working fore-and-aft working space or throat depth of the ultrasonic tool tip would preferably be larger for certain bonding applications.

Also, the use of offset pivotable mountings for the transducer tool support plate would desirably be minimized, thereby minimizing the requirement for springs to counter balance unbalanced forces exerted in supporting the tool support plate by such offset mountings. Moreover, it would be desirable to have a micro-positioner apparatus in which various ultrasonic transducers and other bonding tool accessories such as wire spooling mechanisms, some of which might be substantially heavier than conveniently supportable by prior art micro-positioners, could be used. Such a need arises, for example, in bonding the heavier wires required for connection to certain electronic components such as wound coils and memory disk drive components. In response to the foregoing considerations, the present inventor disclosed a Micro-positioner For Ultrasonic Bonding, U.S. patent application Ser. No. 08/773,637 filed Dec. 24, 1996, now U.S. Pat. No. 5,871,136.

In that patent application the present inventor disclosed a micro-positioner apparatus which has a 4-bar parallelogram linkage that comprises a pantograph-like manipulator input mechanism, and a follower mechanism coupled to the manipulator input mechanism by a ball joint and supporting an ultrasonic transducer housing and bonding tool on a tool support plate. The tool support plate is longitudinal slidably mounted on a tool support guide plate, allowing fore and aft motion of the tool tip. The tool support guide plate is in turn pivotably supported by a yoke having a yaw pivot bearing which allows lateral motion of the tool tip. The yoke is in turn supported by a pitch pivot bearing having a laterally disposed horizontal pivot axis, thereby permitting pivotal motion in a vertical plane of the yoke, tool support plate, and tool tip. By a suitable choice of spacings between the pivot axes of the pantograph manipulator input mechanism, support bearings and ball joint, the tip of the bonding tool is caused to move in coordinate directions of a second coordinate system containing the tool tip in precisely scaled ratios of corresponding motions in a first coordinate system of a manually grasped and manipulated input control knob on the input manipulator mechanism. The input control knob is located at the front or outer end of a fore-and-aft disposed, elongated manipulator input control arm, the rear end of the arm being attached to the front end of a fore-and-aft disposed right-hand one of the four parallelogram linkage bars. The combination of a longitudinally slidable tool support plate with two pivot bearings orthogonal to each other and to the slide axis, provides a micropositioner apparatus which has both a rugged construction capable of supporting heavy loads on the tool support plate, and a substantial throat depth. In a preferred embodiment of the disclosed apparatus, the longitudinal slide axis of the tool tip, and the pivot axes of the pitch and yaw pivot bearings all intersect at a common point, thereby assuring completely orthogonal motions of the tool tip in three orthogonal coordinate directions that are precisely scaled fractions, e.g., ⅛ for lateral (X), and fore-and-aft (Y), and ⅓.₇₅ for up and down (Z) motions.

In U.S. Pat. No. 6,164,514, the present inventor disclosed a micro-manipulator for ultrasonic bonding applications which included a 4-bar, parallelogram manipulator input mechanism and a tool holder follower mechanism which are both pendent from an overlying support structure, thereby affording a work space of potentially unlimited lateral extent below the apparatus. The large work space provides advantages over previously existing micro-manipulators, including a capability for accommodating large workpieces, which may optionally be supported on a conveyor belt located below the apparatus. Although the large lateral extent of the work space afforded by the micro-manipulator disclosed in U.S. Pat. No. 6,164,514 proved highly advantageous, full utilization of that space was hindered in certain applications, for the following reason. The micro-manipulator input mechanism disclosed in the '514 patent includes an input control arm which extends forward from the machine, the arm having at its outer or forward end a control knob which is grasped by an operator and moved in orthogonal directions to produce corresponding smaller motions of a bonding tool tip, in three orthogonal directions. When the control knob was moved downwardly sufficiently far, an operator's hand could inadvertently contact a workpiece which extended laterally sufficiently far from the bonding tool tip. A possible solution for the interference problem would be to increase the length of the input control arm sufficiently for the control knob to extend forward from the desired work space in front of the apparatus, thus avoiding contact of the control arm knob or operator's hand with the workpiece. However, increasing the length of the control arm would undesirably alter the kinematic scaling ratios of tool tip motions to input control knob motions. The present invention was conceived of to solve the above-described mechanical interference problem without altering existing scaling ratios between the control arm and tool tip of a micro-manipulator, thus expanding useable working space of the micro-manipulator.

OBJECTS OF THE INVENTION

An object of the present invention is to provide an auxiliary control apparatus for a micro-manipulator used to position a bonding tool of an ultrasonic bonding machine, the apparatus having a motion control mechanism which is mechanically coupleable to an input control member of a manipulator input mechanism of the micro-manipulator to thereby effect motions of the micro-manipulator and bonding tool to motions of a hand control knob and arm of the apparatus.

Another object of the invention is to provide an auxiliary control apparatus coupleable to an input control member of a micro-manipulator in which an input control arm and hand control knob of the auxiliary control apparatus are spaced further from an ultrasonic bonding tool positionable by the micro-manipulator than the input control member of the micro-manipulator, thereby increasing the size of a work space beneath the bonding tool and thereby increasing the size of workpieces which may be accommodated by the bonding machine.

Another object of the invention is to provide an auxiliary control apparatus for micro-manipulators which is mechanically coupleable to a 4-bar parallelogram-type micro-manipulator input mechanism and in which ratios of motions of a tool tip in response to motions of a control member of a motion control mechanism of the apparatus are the same as the ratios of tool tip motions to motions of an input member of the micro-manipulator input mechanism.

Another object of the invention is to provide an auxiliary control apparatus for micro-manipulators which includes a motion control mechanism that is mechanically coupleable to a 4-bar parallelogram-type micro-manipulator input mechanism at a location spaced laterally outwards from the input mechanism and a tool tip positionable thereby, the auxiliary control mechanism including a 4-bar planar parallelogram assembly co-planar with that of the micro-manipulator input mechanism, the micro-manipulator input mechanism having a forward protruding input control member which has a hand-operable control knob replaced by a pivotable adapter coupling which joins the input control member to a connector arm comprised of a laterally inwardly protruding extension of a front lateral linkage bar of the auxiliary control mechanism linkage, the auxiliary control mechanism linkage having a pair of left and right, fore-and-aft disposed longer parallel longitudinal linkage bars pivotably mounted at front ends thereof to the front lateral linkage bar, and rear ends pivotably mounted to a rear lateral linkage bar which is mounted by a linear bearing to a support structure for the micro-manipulator input mechanism and the auxiliary mechanism to thereby enable fore-and-aft movement in unison of auxiliary control and micro-manipulator input control mechanisms in response to movements of an auxiliary hand control arm knob which terminates the end of an auxiliary control arm that depends downwardly and forwardly from the right-hand, long fore-and-aft disposed longitudinal linkage bar of the auxiliary input control mechanism.

Various other objects and advantages of the present invention, and its most novel features, will become apparent to those skilled in the art by perusing the accompanying specification, drawings and claims.

It is to be understood that although the invention disclosed herein is fully capable of achieving the objects and providing the advantages described, the characteristics of the invention described herein are merely illustrative of the preferred embodiments. Accordingly, I do not intend that the scope of my exclusive rights and privileges in the invention be limited to details of the embodiments described. I do intend that equivalents, adaptations and modifications of the invention reasonably inferable from the description contained herein be included within the scope of the invention as defined by the appended claims.

SUMMARY OF THE INVENTION

Briefly stated, the present invention comprehends an apparatus for improving performance capabilities of micro-manipulators of a type which are used to position the tip of an ultrasonic tool tip relative to bonding sites on a workpiece. Specifically, the invention comprehends an auxiliary control apparatus for micro-manipulators which includes a manually operable motion control mechanism that is mechanically coupleable to the input control member of a micro-manipulator of an ultrasonic bonding machine, and mountable to the machine at a location more remote from a bonding tool positionable by the machine than the input control member. In a preferred embodiment of the invention, the auxiliary control mechanism is mounted to the machine at a location laterally offset further from the bonding tool than the micro-manipulator control arm, thus expanding the lateral extent of useable working space below the bonding tool and in front of the machine, and thereby enabling the machine to be conveniently used to make bonds on larger workpieces. The apparatus according to the present invention is intended primarily for use with micro-manipulators which utilize a 4-bar parallelogram linkage that has an output coupling arm coupled to a tool support plate movably mounted to a machine support structure and so constructed as to effect motions of the tip of an ultrasonic bonding tool mounted to the tool support plate in three orthogonal directions which are parallel to those of a micro-manipulator control knob attached to an input member of a micro-manipulator input mechanism. Such micro-manipulators are usually constructed so that magnitudes of tool tip motions in each of the coordinate directions are predetermined ratios of input control knob motions, e.g., ⅛th, thus enabling the tool tip to be precisely positioned relative to workpiece bonding sites in spite of small tremors in the hand of the operator who is manipulating the control knob.

The auxiliary control apparatus according to the present invention includes a manually operable motion control mechanism control knob and is so constructed that motions of the control knob result in tool tip motions which are in the same predetermined ratios relative to motions of the auxiliary control apparatus knob as ratios of tool tip motions to micro-manipulator control knob motions.

Included in a preferred embodiment of a motion control mechanism of an auxiliary control apparatus for micro-manipulators according to the present invention is a 4-bar, parallelogram linkage assembly, which is mounted by a translatable support mounting to a vertically disposed support structure, specifically, a fore-and-aft, or longitudinally disposed stanchion plate of an ultrasonic bonding machine. The stanchion plate is one of a pair of laterally spaced apart, parallel left and right stanchion plates which support rear upper ends of a laterally disposed horizontal beam to which is mounted a micro-manipulator that is used to position an ultrasonic bonding tool relative to a workpiece positioned in front of the machine. The 4-bar parallelogram linkage of the motion control mechanism has a rear lateral linkage bar which is pivotably coupled to a translatable support mounting comprising a horizontally disposed trolley block that is longitudinally translatably mounted by a longitudinally disposed linear bearing assembly to a stanchion plate. The linear bearing assembly includes a longitudinally disposed guide rail mounted on an outer vertical surface of the stanchion plate, and a bearing block mounted on an inner vertical surface of the trolley block, respectively. Cylindrical roller bearings within the bearing block rollably support the bearing block on the guide rail.

In a preferred embodiment, for utilization with an existing ultrasonic bonding machine which includes a micro-manipulator control knob located near a right-hand side of the machine, the motion control mechanism is mounted to the right-hand side of the right-hand stanchion plate of the machine.

The motion control mechanism of the auxiliary control apparatus according to the present invention also includes a vertically disposed gusset plate which is mounted onto one side of the longitudinally translatable trolley block. The gusset plate has protruding laterally outwards from an outer side thereof a laterally disposed pivot axle which supports the parallelogram linkage assembly of the auxiliary control mechanism. Thus, the pivot axle pivotably supports a short, horizontally disposed, laterally elongated rectangularly-shaped block which comprises a rear, lateral linkage bar of a 4-bar parallelogram linkage assembly of the auxiliary control mechanism.

The linkage assembly includes a pair of parallel inner and outer, left and right fore-and-aft disposed longitudinal linkage bars which are longer than the rear lateral linkage bar. The left and right longitudinal linkage bars are mounted at rear ends thereof to left and right vertical rear pivot axles which are disposed vertically through the rear lateral linkage bar, forward of a laterally disposed pivot bore which extends through the rear lateral linkage bar and which coaxially receives the support pivot axle.

The motion control mechanism of the auxiliary control apparatus also includes a front laterally disposed linkage bar which is parallel to and has the same length as the rear lateral linkage bar. The front lateral linkage bar has parallel, horizontally disposed upper and lower surfaces, and comprises the fourth linkage bar of the linkage. Also, the front lateral linkage bar is located below front end portions of the left and right, fore-and-aft disposed longitudinal linkage bars, and is pivotably mounted with respect thereto by a pair of left and right vertical front pivot axles which are disposed vertically through the front lateral linkage bar, near front end portions of the longitudinal linkage bars.

The motion control mechanism includes a hand control arm which angles downwardly and forwardly from a lower side of the outer, or right-hand longitudinal linkage bar, near the front end of the bar. The hand control arm includes a cylindrically-shaped, bent elbow coupler which depends perpendicularly downwards from a lower side of the right-hand longitudinal linkage bar, at a location rearward of the right front vertical pivot axle. The elbow coupler has a lower front portion which angles downwardly and forwardly from a rear vertical portion thereof. An elongated straight cylindrical control arm shaft of smaller diameter than the elbow coupler protrudes coaxially from a front lower end face of the of the elbow coupler. The control arm shaft has a short upwardly and forwardly angled end portion which is terminated by a generally hemispherically-shaped hand control knob.

The auxiliary control apparatus according to the present invention also includes a laterally disposed connector arm which couples the motion control mechanism of the apparatus to the input member of a micro-manipulator input mechanism. The laterally disposed connector arm is comprised of an extension of the front lateral linkage bar. The connector arm protrudes laterally inwardly from that portion of the front linkage bar located to the left of the front vertically disposed pivot axle. The connector arm is of sufficient length to protrude laterally inwardly beyond the inner or left-hand side of the right-hand vertical machine support stanchion plate. At the inner, or left-hand end of the connector arm is located an adapter coupling joint which pivotably connects the connector arm to the front end of a fore-and-aft disposed input member of a micro-manipulator input mechanism. The micro-positioner input member is preferably shortened from its original value to a length which, when added to the fore-and-aft distance between the coupler arm and the auxiliary control knob, positions the auxiliary control knob at the same distance forward of the micro-manipulator as was the original micro-positioner control knob at the front end of the original manipulator input member.

The adapter coupling joint has a pivot pin which is disposed perpendicularly to a flat upper surface of the longitudinally disposed input member of the micro-manipulator.

Thus, the adapter coupling joint enables the micro-manipulator input arm to be translated longitudinally in fore-and-aft, plus/minus Y directions in unison with the auxiliary control knob of the auxiliary control apparatus, when the trolley block of the 4-bar linkage assembly of the auxiliary control mechanism is translated fore-and-aft in response to fore-and-aft manipulations of the auxiliary hand control knob by an operator. Also, the forward end of the micro-manipulator input member attached to the adapter coupler is translated laterally left and right, a minus and plus X, directions, in response to left and right motions of the auxiliary hand control knob of the auxiliary control apparatus. In addition, pivotal motion of the rear lateral linkage bar about the laterally disposed, mechanism support pivot axle in response to up/down, plus/minus Z direction translations of the auxiliary hand control knob tilts the plane of the linkage assembly up or down from a generally horizontal quiescent orientation, thereby causing the micro-manipulator input arm and coupler to be translated up and down in unison with the auxiliary hand control knob.

DESCRIPTION OF THE PREFERRED EMBODIMENTS

An understanding of the structure and function of the present invention, and of the most novel and advantageous features thereof, may be facilitated by a review of prior art micro-manipulator mechanisms for ultrasonic bonding machines, of the type the present invention is intended to be connected. Details of the structure and function in addition to those disclosed below may be found in the present inventors' patents listed below, and the entire specifications of those patents are hereby incorporated by reference into the present application: U.S. Pat. No. 5,871,136, Micro-positioner For Ultrasonic Bonding; U.S. Pat. No. 6,164,514, Micro-manipulator For Ultrasonic Bonding With Orthogonal Tool Support Slides.

Figure 1:
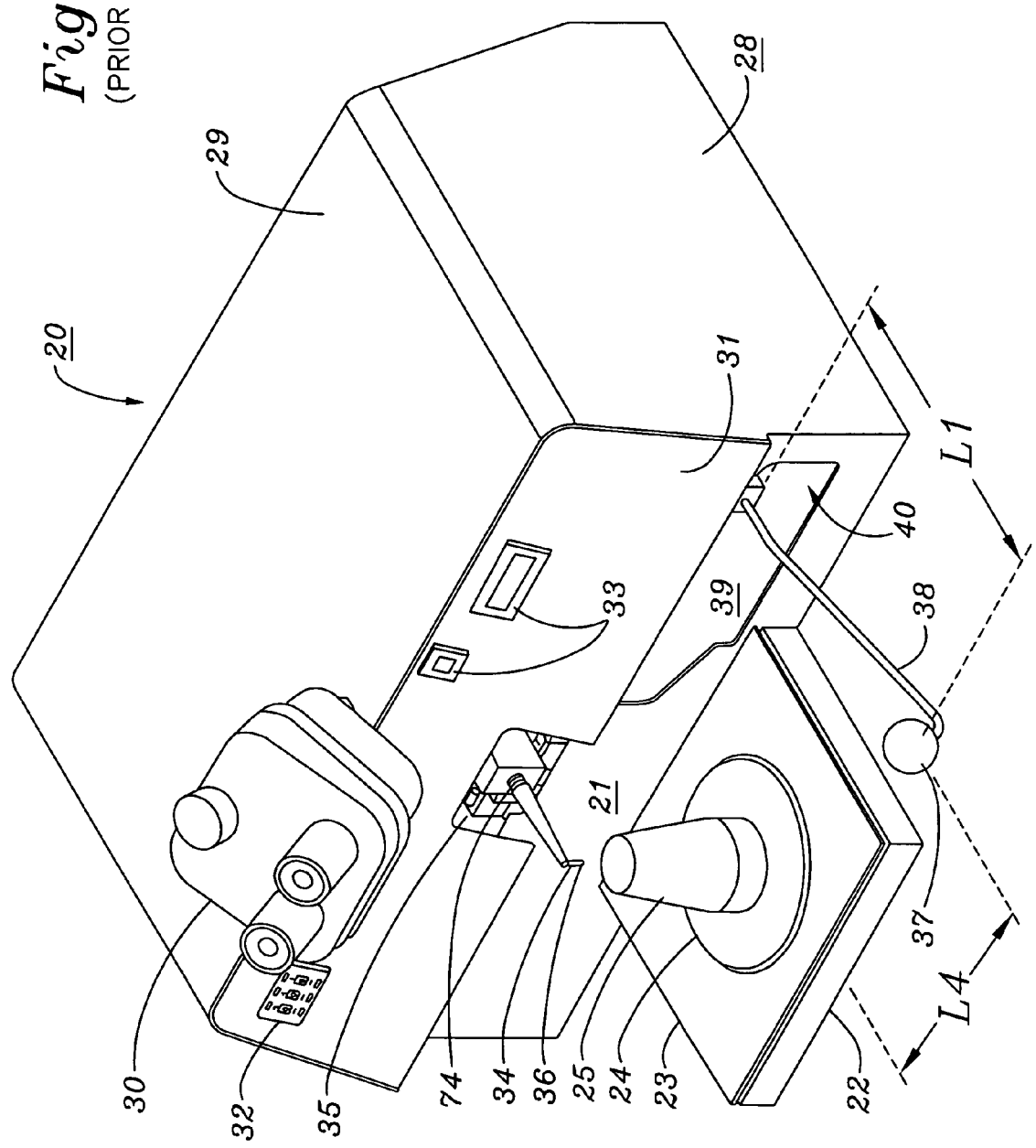
FIG. 1 is an upper perspective view of a prior art micro-manipulator apparatus, showing the apparatus mounted on a support base and showing other elements combined with the apparatus to comprise an ultrasonic body machine.

FIG. 1 shows a prior art micro-manipulator apparatus 40 according to the present invention, operably interconnected with other elements to comprise a manually operable ultrasonic bonding machine 20. Bonding machine 20 is used typically to make ultrasonic wire bonds on miniature electronic components such as monolithic or hybrid micro circuits. As shown in FIG. 1, bonding machine 20 includes a base plate 21 on which is mounted micro-manipulator apparatus 40, which is described in detail below. A rectangularly shaped platform 22 protrudes forward from base plate 21 and supports a work table 23 which may include a turntable 24 for rotatably supporting a workpiece support pedestal 25, which in turn is used to support a microcircuit or other work piece.

Figure 2:
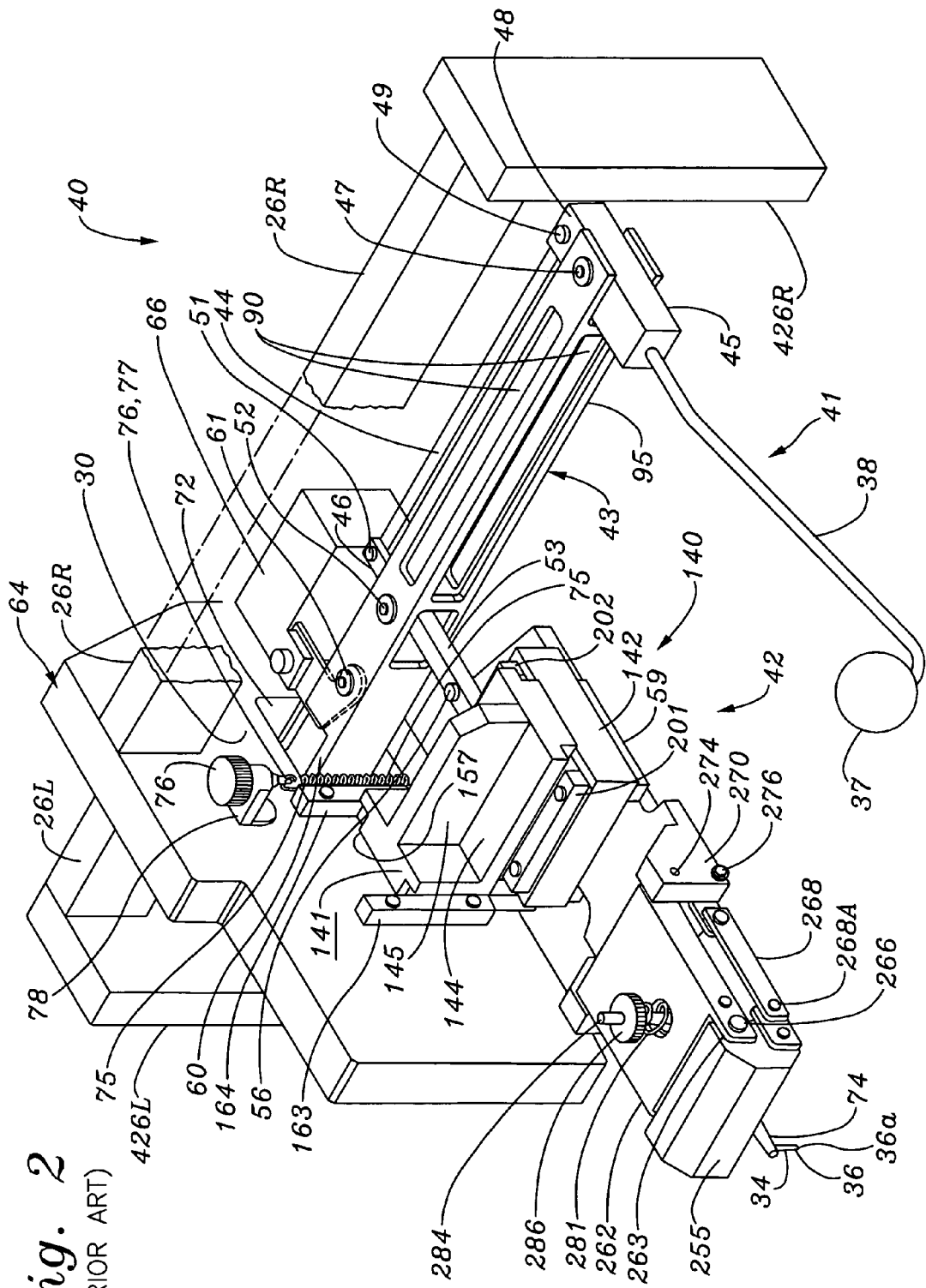
FIG. 2 is a fragmentary perspective view of the prior art bonding machine of FIG. 1, showing certain components thereof removed to better reveal the micro-manipulator apparatus portion of the machine.
Figure 3:
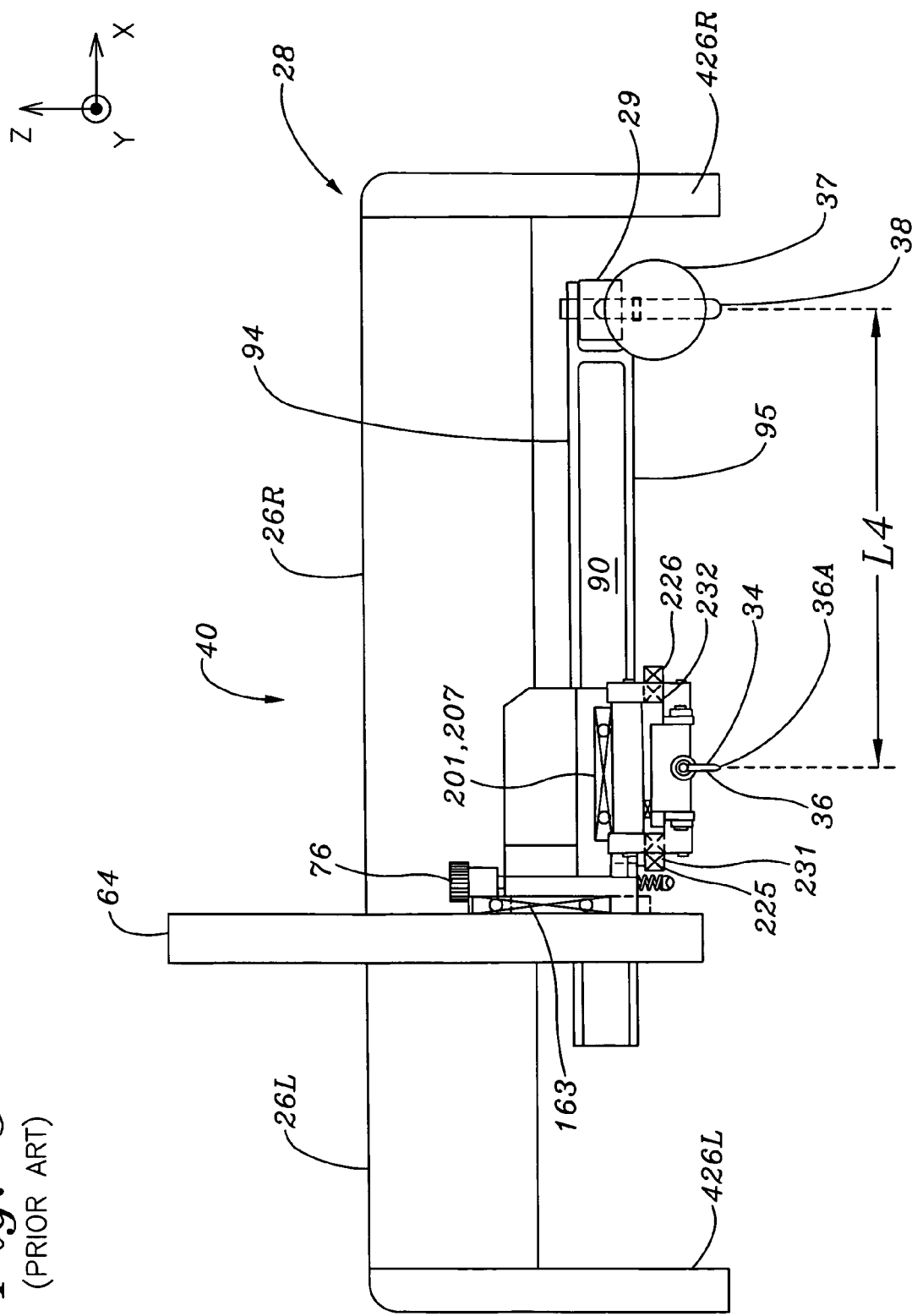
FIG. 3 is a front elevation view of the prior art apparatus of FIG. 2.

As shown in FIGS. 2-3, micro-manipulator apparatus 40 includes a main vertically disposed support plate 64. Vertical support plate 64 is disposed in a fore-and-aft or longitudinal direction and is held between short left and longer, laterally disposed horizontal right and left support beams 26L and 26R, respectively. Support beams 26L, 26R are supported at outer lateral ends thereof by vertically disposed stanchion plate 426L, 426R, respectively.

Referring again to FIG. 1, ultrasonic bonding machine 20 may be seen to include a housing 28 having an upper panel 29 on which is mounted a stereo microscope 30. Microscope 30 has a field of view which encompasses a microcircuit or other such work piece placed on the upper surface of work support pedestal 25. Housing 28 includes a front panel 31 on which are mounted various controls 32 such as control switches and indicating devices 33.

Ultrasonic bonding machine 20 includes an ultrasonic bonding tool 34 which includes a transducer tip and impedance matching horn 74A that protrudes forward of front panel 31 of housing 28. An ultrasonic bonding tool 36 provided with a tapered tip or point 36A protrudes downwardly from the outer end of transducer horn 74A. As will be described in detail below, bonding tool 34 is mechanically coupled to micro-manipulator apparatus 40 located within housing 28. Micro-manipulator 40 according to the present invention provides means for precisely positioning tip 36A of ultrasonic bonding tool 36 relative to a work piece. Positioning of bonding tool tip 36A is accomplished by manually operating a control knob 37 attached to the outer end of a control arm 38 that protrudes forward of front panel 31 of housing 28.

Referring now to FIG. 2, ultrasonic bonding machine 20 of FIG. 1 is shown with housing 28 removed, thereby revealing construction details of micro-manipulator apparatus 40. In FIGS. 1 and 2 and the remaining figures, various electrical, electronic and mechanical components which operatively interact with micro-manipulator apparatus 40 have been deleted to facilitate an understanding of the structure and function of the micro-manipulator apparatus. The structure and function of the deleted items are clearly described in the present inventor's prior U.S. Pat. Nos. 3,474,685 and 5,163,728, and the description of those elements contained in the aforementioned patents are hereby incorporated by reference into the present specification.

The structure and function of prior art micro-manipulator apparatus 40 according to the present invention may be more readily understood by first reviewing certain geometrical relationships between various elements of the apparatus.

Referring now to FIGS. 2-5, micro-manipulator apparatus 40 may be seen to include a manipulator input mechanism, designated generally by the element number 41, which includes a pantograph-type, four-bar parallelogram linkage assembly. Apparatus 40 also includes a follower mechanism 42 for movably supporting and precisely positioning an implement such as ultrasonic bonding tool 34, in response to command motions input to control knob 37 of input manipulator mechanism 41 by the hand of an operator.

Figure 4:
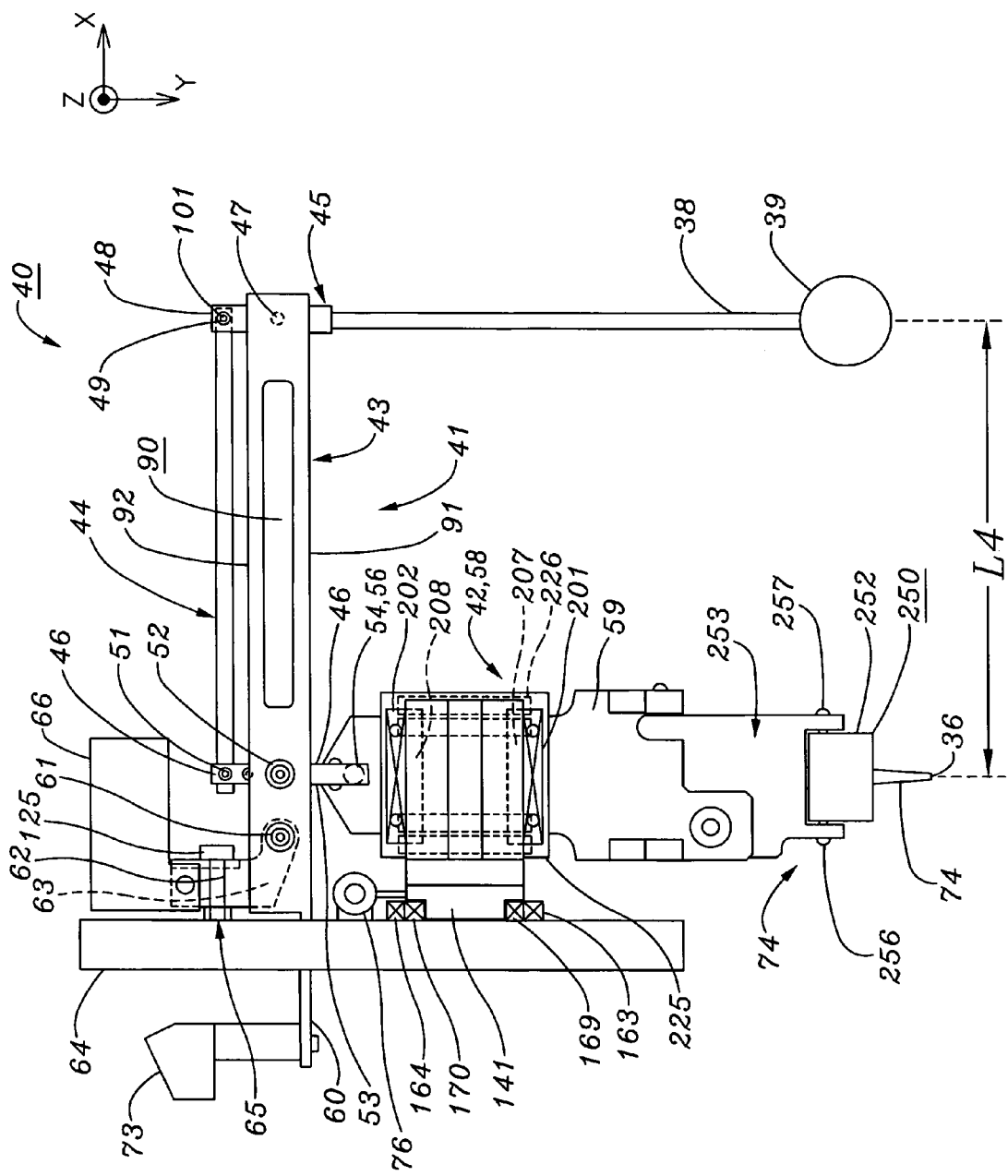
FIG. 4 is a fragmentary upper plan view of the prior art apparatus of FIG. 2, showing a tool support slide thereof.

As may be seen by referring to FIGS. 2-5, manipulator input mechanism 41 of micro-manipulator apparatus 40 includes a first, straight, generally laterally disposed front manipulator arm or beam 43 of relatively large cross-section, and a straight rear laterally disposed tie bar 44 of equal length but smaller cross section located rearwardly of the front arm. Manipulator beam 43 and tie bar 44 are pivotably joined to form a four-bar, parallelogram linkage, by short, straight fore-and-aft, or longitudinally disposed outer and inner longitudinal linkage bars 45 and 46, respectively. Thus, as shown in FIG. 4, a first, front outer pantograph pivot bearing 47 having a pivot axis disposed perpendicularly to front manipulator beam 43 joins the front manipulator beam to short, longitudinally disposed outer linkage bar 45. The inner or rear longitudinal end 48 of outer longitudinal linkage bar 45 is joined to rear tie bar 44 by a second, rear outer pantograph pivot bearing 49 which has a pivot axis parallel to that of first pivot bearing 47. Outer longitudinal linkage bar 45 has a portion that protrudes forward from first pivot bearing 47, beyond manipulator beam 43, where it is attached to the inner longitudinal end of manipulator input control arm 38.

Figure 5:
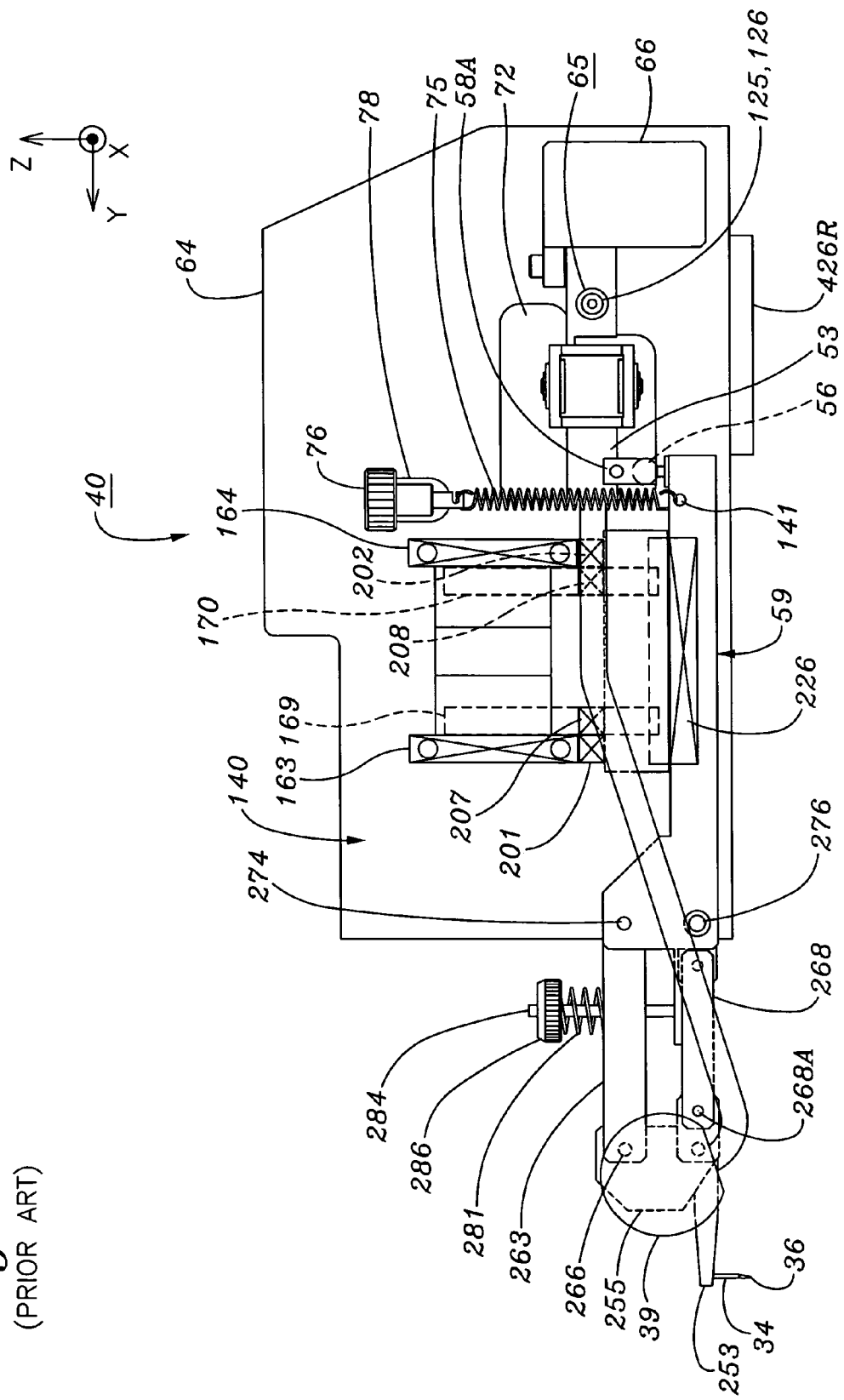
FIG. 5 is a fragmentary right side elevation view of the prior art apparatus of FIG. 2.

Referring still to FIG. 4, short inner longitudinal linkage bar 46 of input pantograph mechanism 41 may be seen to be pivotably joined at a rear longitudinal end thereof to the inner or left end of tie bar 44, by means of a third, rear inner pantograph pivot bearing 51 which has an axis parallel to the axes of first pivot bearing 47 and second pivot bearing 49. Inner longitudinal linkage bar 46 is also pivotably joined to front manipulator beam 43 by a fourth, front inner pantograph pivot bearing 52 which has a pivot axis parallel to the axes of bearings one, two and three. As may be seen best by referring to FIGS. 2, 4 and 5, inner longitudinal linkage bar 46 also has a section 53 that protrudes forward beyond the front edge of manipulator beam 43, the forward protruding section having a downwardly protruding vertical leg section 54. Forward protruding section 53 of inner longitudinal linkage bar 46 of manipulator input mechanism 41 serves as an output coupling arm for coupling motions of input pantograph mechanism 41 to follower mechanism 42. Thus, as shown in FIGS. 2, 4 and 5, vertical leg section 54 of inner linkage bar 46 has protruding perpendicularly downward therefrom a socket 57 for a ball joint 56. As shown in FIG. 4, the vertical axis of ball joint 56 is located forward of the axis of fourth, front inner pantograph bearing 52. Ball joint 56 includes a ball 58 that protrudes upwardly from a tool support plate 59, which is described below. The ball 58 serves as an input member coupling for transferring motions of input mechanism 41 to follower 42.

As may be seen best by referring to FIG. 4, manipulator beam 43 has an extension portion 60 that protrudes laterally inwardly beyond inner longitudinal linkage bar 46 and fourth, front inner pantograph pivot joint bearing 52. Extension 60 is pivotably joined by a fifth, pantograph support pivot bearing 61 to a laterally outwardly protruding lug 63 of a pantograph hanger 62. Fifth pivot bearing 61 is parallel to and longitudinally aligned with first and fourth pivot bearings 47 and 52 of pantograph manipulator input mechanism 41.

As may be seen best by referring to FIG. 4 in addition to FIG. 2, pantograph hanger 62 is pivotably joined to a vertical support plate 64 by means of a sixth, hanger support pivot bearing 65. The axle pin 125 of sixth, hanger support pivot bearing 65 is oriented horizontally, i.e., parallel to base plate 21, and serves as the primary support member for manipulator beam 43 and other previously described components of manipulator input pantograph mechanism 41.

As may be seen best by referring to FIG. 4, extension 60 of manipulator beam 43 protrudes laterally inwards through a generally rectangularly-shaped aperture 72 provided through the thickness dimension of vertical support plate 64. As shown in FIG. 5, aperture 72 is located near the rear and lower edge walls of vertical support plate 64.

As may be seen best by referring to FIG. 4, manipulator input mechanism 41 includes a first, Y-axis counterweight 73 located on the left side of vertical support plate 64 that is attached to that portion of manipulator beam extension 60 that protrudes through aperture 72 of the support plate. A primary function of Y-axis counterweight 73 is to counter balance the weights of those parts of manipulator input mechanism 41 located lateral outwardly from or on the right hand side of fifth vertical beam support bearing 61. Thus, as viewed from above, as in FIG. 4, counterweight 73 exerts an inertial moment arm about vertical pivot axis 61 which counteracts that of control arm 38 and other parts of manipulator input mechanism 41 located laterally outward from or to the right of the vertical pivot axis. Therefore, when control knob 37 is moved longitudinally inwardly or outwardly parallel to vertical support plate 64, in a Y-axis direction, the tactile dynamic response to an operator grasping the control knob will be relatively neutral.

As shown in FIGS. 2 and 4, pantograph input mechanism 41 of micro-manipulator 40 also includes a second, Z-axis counterweight 66. Z-axis counterweight 66 has the shape generally of a rectangular block, and is attached to the right-hand or outer side wall of pantograph support hanger 62, rearward of horizontally disposed hanger support pivot bearing 65. Z-axis counterweight 66 exerts a clockwise torque on manipulator hanger 62, about the axis of horizontal hanger support bearing 65, as viewed from the right-hand side of vertical support plate. This clockwise torque counteracts the counter-clockwise torques exerted on hanger support bearing 65 by the weight of manipulator input mechanism control arm 38, and other components of the manipulator input mechanism located forward of hanger support bearing 65. Clockwise torque exerted by Z-axis counterweight 66 also counteracts torques produced by the weight of tool support plate 59 and components attached thereto acting through ball joint 56 on manipulator beam 43.

Since, as shown in FIGS. 1 and 2, various ultrasonic bonding tools 34 and ultrasonic transducers 74 may be interchangeably mounted from time to time on tool support plate 59, micro-manipulator apparatus 40 preferably includes means for exerting on the tool support plate an upwardly directed force to compensate for the weight of the tool plate and objects supported by the tool plate. To this end, as shown in FIG. 2, a tension spring 75 is provided which is attached at an upper longitudinal end thereof to an adjustment screw 76 which is threadably received in a threaded bore 77 vertically disposed through a bracket 78 which protrudes laterally outwards from the right side wall of vertical support plate 64. The lower end of spring 75 is attached to the upper surface of a vertical beam slide assembly 141 which supports tool support plate 59 in a manner which is described in detail below.

Follower mechanism 42 of micro-manipulator apparatus 40 includes a vertically cascaded series of plate-like bearing structures which are linearly translatable in three mutually perpendicular directions. The bearing structures utilize linear bearing assemblies to enable low friction movement of bonding tool 36 with respect to a workpiece in those directions. Thus, as shown in FIGS. 3-5, follower mechanism 42 includes a vertically translatable, Z-axis plate-like bearing structure 141 which is vertically translatably mounted to the right-hand side of vertical support plate 64 by means of a front linear bearing assembly comprised of front outer and inner vertically disposed bearing blocks 163,169 located at a front vertical edge of vertical bearing structure 141, and a rear linear bearing assembly comprised of an outer and inner vertically disposed pair of bearing blocks 164,170 located at a rear vertical edge of vertical bearing structure 141.

Follower mechanism 42 also includes an intermediate, X-axis plate-like bearing structure 142, which is laterally translatably mounted to a horizontally disposed base plate that protrudes perpendicularly outwards from vertical bearing structure 141. X-axis bearing structure 142 is horizontally translatably mounted to the lower surface of base 144 of vertical bearing structure 141 by means of a front linear bearing assembly comprised of an outer and inner pair of transversely disposed bearing blocks, 201,207, respectively, located at a front transversely disposed edge of X-axis bearing structure 142, and a rear linear bearing assembly comprised of an outer and inner pair of transversely disposed outer and inner bearing blocks 202,208, respectively, located at a rear transversely disposed edge of the X-axis bearing structure.

Also included in follower mechanism 42 is a third, bottom Y-axis bearing structure/tool support plate 59 which is translatably mounted in a fore-and-aft or longitudinal direction to a lower side of X-axis bearing structure 142. Y-axis bearing structure/tool support plate 59 is translatably mounted to the lower surface of intermediate, X-axis bearing structure 142 by means of a left linear bearing assembly which includes a left outer and inner pair of longitudinally disposed bearing blocks, 225,231, respectively, located at a left longitudinal edge of the Y-axis plate 59, and a right linear bearing assembly which includes a right outer and inner pair of longitudinally disposed outer and inner pair of bearing blocks 226,232, respectively, located at a right longitudinal edge of the Y-axis bearing structure/tool support plate.

Referring to FIGS. 2-4, it may be understood that translating hand control knob 39 of pantograph manipulator input mechanism 41 in a lateral, left/right minus or plus X direction causes a front end portion of left-hand short inner longitudinal linkage bar 46 of the 4-bar pantograph input mechanism to be translated in minus and plus, left/right motions which are precisely scaled ratios, e.g., fractions such as ⅛th, of motions of the hand control knob. Motions of the front end portion of inner longitudinal linkage bar 46 in turn cause ball joint 56 and Y-axis tool support plate 59 to be translated laterally in left/right, minus/plus X directions, the Y-axis tool support plate rollably translating in the X direction by means of the X-axis bearing pairs.

Movement of hand control knob 39 in a longitudinal, Y-axis direction causes tool support plate Y-axis bearing structure 59 to be translated in scaled motions in fore-and-aft directions, which are precisely scaled fractions, e.g., ⅛th, of motions of the hand control knob, thus moving bonding tool 36 in precisely scaled fore-and-aft directions.

Referring to FIG. 5, up/down, plus/minus movement of control knob 39 causes pantograph input mechanism 41 to pivot about transversely disposed hanger support pivot bearing 65, thus causing bonding tool to be translated upwardly/downwardly in plus/minus Z direction motions which are precisely scaled fractions, e.g., ½, of up/down motions of the hand control knob.

Summarizing functions of prior micro-manipulator apparatus 40, motions in a first three-dimensional coordinate system of the tip 36A of an ultrasonic bonding tool 36 attached to a tool support plate are effected in reaction to input command motions in a second coordinate system of control knob 37 of manipulator mechanism 41 by the hand of an operator. Motions of the tool tip in each of three orthogonal directions in the first coordinate system are precisely predetermined ratios, typically fractional values less than one, of corresponding motions of the hand control knob in the second coordinate system, which has three coordinate directions parallel to the three coordinate directions of the first coordinate systems. It should be noted that in U.S. Pat. No. 6,164,514, the coordinate system of input control knob 37 of manipulator input mechanism was defined as a first coordinate system, while motions of the tool tip 36A of follower mechanism were described as the second coordinate system. Those designations of course are a matter of choice, and for convenience in the ensuing description of the present invention, the coordinate system of the tool tip is designated as a first coordinate system, the coordinate system of the hand control knob of the manipulator input mechanism of a micro-manipulator is designated as a second coordinate system, and the coordinate system of an auxiliary control input of the auxiliary control apparatus according to the present invention is designated as a third coordinate system.

FIGS. 6-13 illustrate an auxiliary control mechanism 500 for micro-manipulator used in ultrasonic bonding machines, according to the present invention. In those figures, the control mechanism 500 is shown connected to a micro-manipulator of an ultrasonic bonding machine 20, of the type described above.

Figure 6:
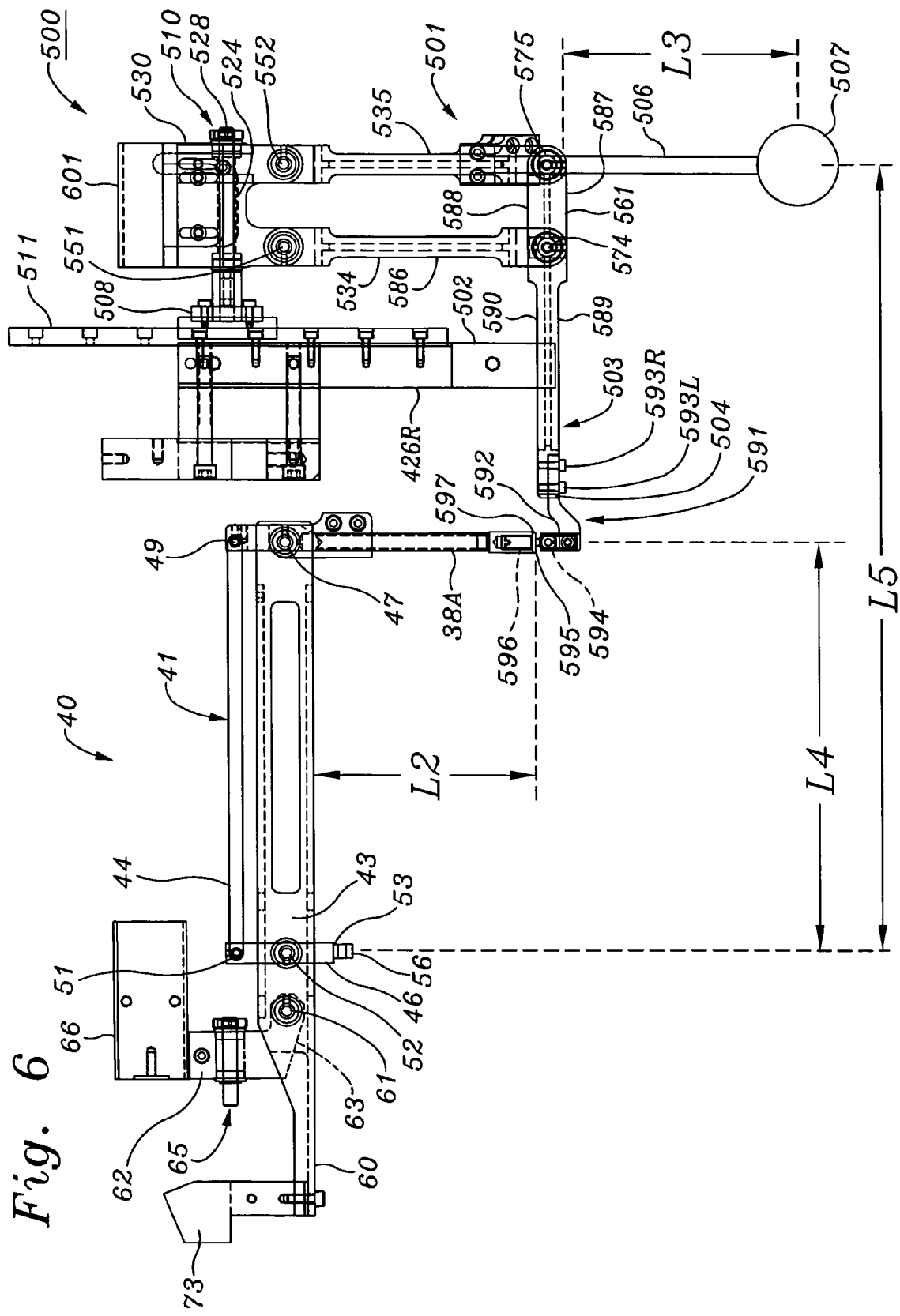
FIG. 6 is an upper plan view of an auxiliary control apparatus for micro-manipulators used in ultrasonic bonding machines, according to the present invention, showing the apparatus mechanically coupled to the micro-manipulator apparatus of FIGS. 1-5.

Referring now to FIGS. 6-13, an auxiliary control mechanism 500 for micro-manipulator may be seen to include a 4-bar, parallelogram linkage assembly 501 which is translatably mounted to a right-hand side 502 of a right-hand stanchion plate 426R of an ultrasonic bonding machine 20 which includes a micro-manipulator apparatus 40. As will be described in detail below, parallelogram linkage assembly 501 has a laterally inwardly (to the left in FIG. 6) disposed connector arm 503 which is pivotably connected at an inner, left end 504 thereof to a front end portion 595 of a fore-and-aft disposed input control member 38A of micro-manipulator apparatus 40. Input control member 38A of micro-manipulator apparatus 40 is shortened from an original length L1, as shown in FIG. 1, to a length L2, as shown in FIG. 6. Auxiliary micro-manipulator input control mechanism 500 also includes a longitudinally disposed control arm 506 which protrudes forward from parallelogram linkage 501, the control arm being terminated at a front end thereof by a generally hemispherically-shaped hand control knob 507. In a preferred embodiment, control arm 506 of auxiliary control mechanism 500 has a length L3 which, when added to length L2 of shortened micro-manipulator input control member 38A, positions auxiliary hand control knob 507 at the same distance forward of front outer pantograph bearing 47 of micro-manipulator apparatus 40 as original hand control knob 37, shown in FIGS. 1-5.

Referring to FIGS. 6-10, it may be seen that parallelogram linkage assembly 501 of auxiliary input control mechanism 500 has in a neutral, unmanipulated configuration a generally rectangular, horizontally disposed shape which is elongated in a fore-and-aft, or longitudinal direction.

Auxiliary micro-manipulator control mechanism 500 includes a trolley block 508 which is mounted to right-hand side 502 of stanchion plate 426R by means of a linear bearing assembly 509. Linear bearing assembly 509 has a longitudinal axis which is disposed in a fore-and-aft, longitudinal direction, and bearings which enable trolley block 508 to be translated within minimal frictional resistance in fore-and-aft, plus/minus Y-axis directions. Also included in auxiliary control mechanism 500 is a pivot joint 510 which pivotably connects parallelogram linkage assembly 501 to trolley block 508, in a manner enabling the parallelogram linkage assembly to be pivoted in up/down, plus/minus Z directions.

The structure and function of bearing assembly 509 and pivot joint 510 are described in detail below.

Figure 7:
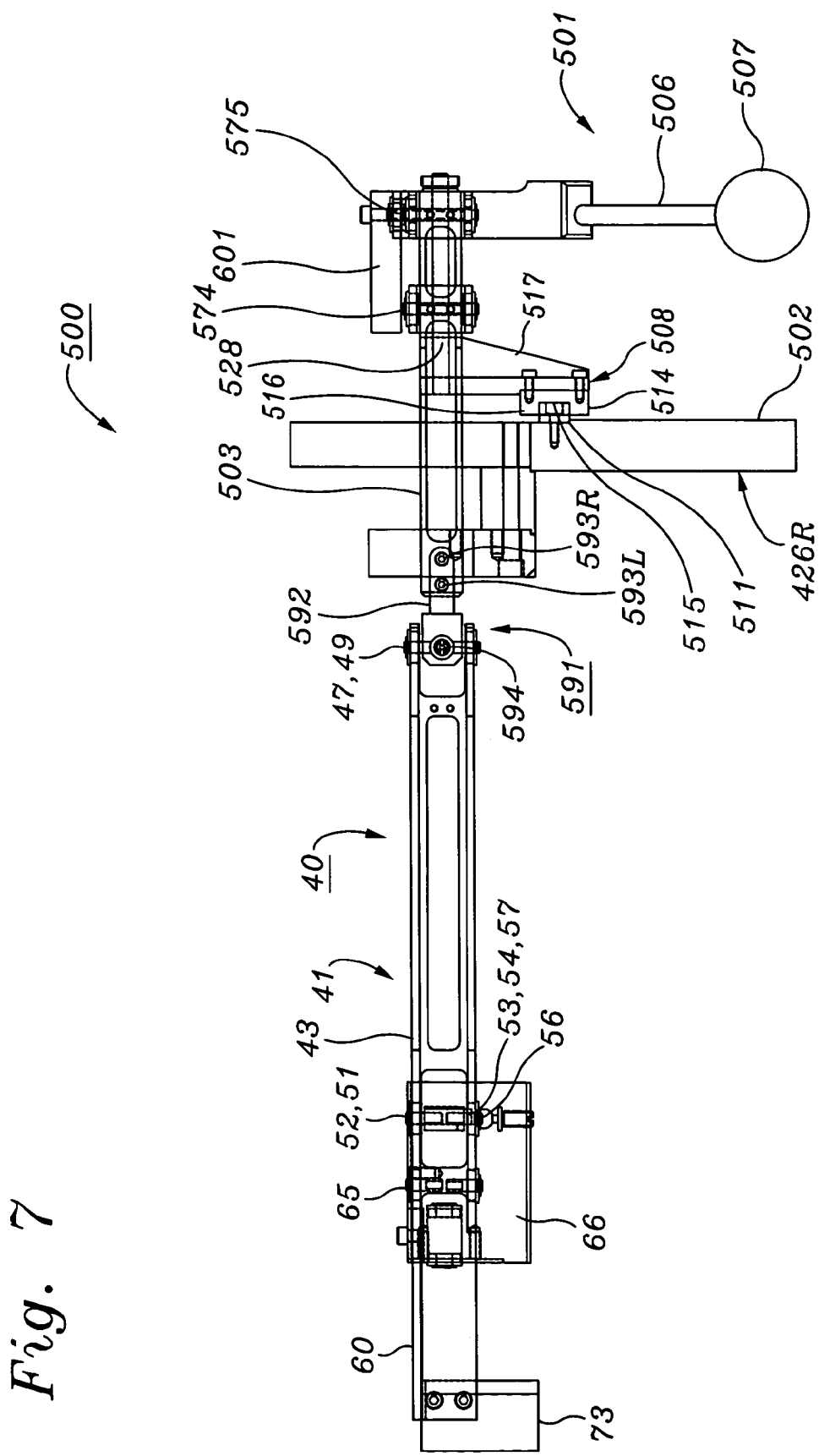
FIG. 7 is a front elevation view of the apparatus of FIG. 6.

Referring to FIGS. 6-10, it may be seen that linear bearing assembly 509 for longitudinally translatably supporting trolley block 508 includes a longitudinally elongated, rectangularly-shaped guide rail 511. Guide rail 511 is disposed horizontally rearward from a location near front vertical edge wall 512 of the stanchion plate to a location rearward of rear vertical edge wall 513 of the stanchion plate. Linear bearing assembly 509 also includes a longitudinally elongated, rectangularly-shaped bearing block 514. As shown in FIG. 7, bearing block 514 has a longitudinally disposed, rectangular cross-section channel 515 formed in an inner vertical wall surface 516 of the bearing block. Channel 515 longitudinally translatably receives guide rail 511, and is longitudinally rollably supported thereon by cylindrical roller bearings (not shown).

Figure 8:
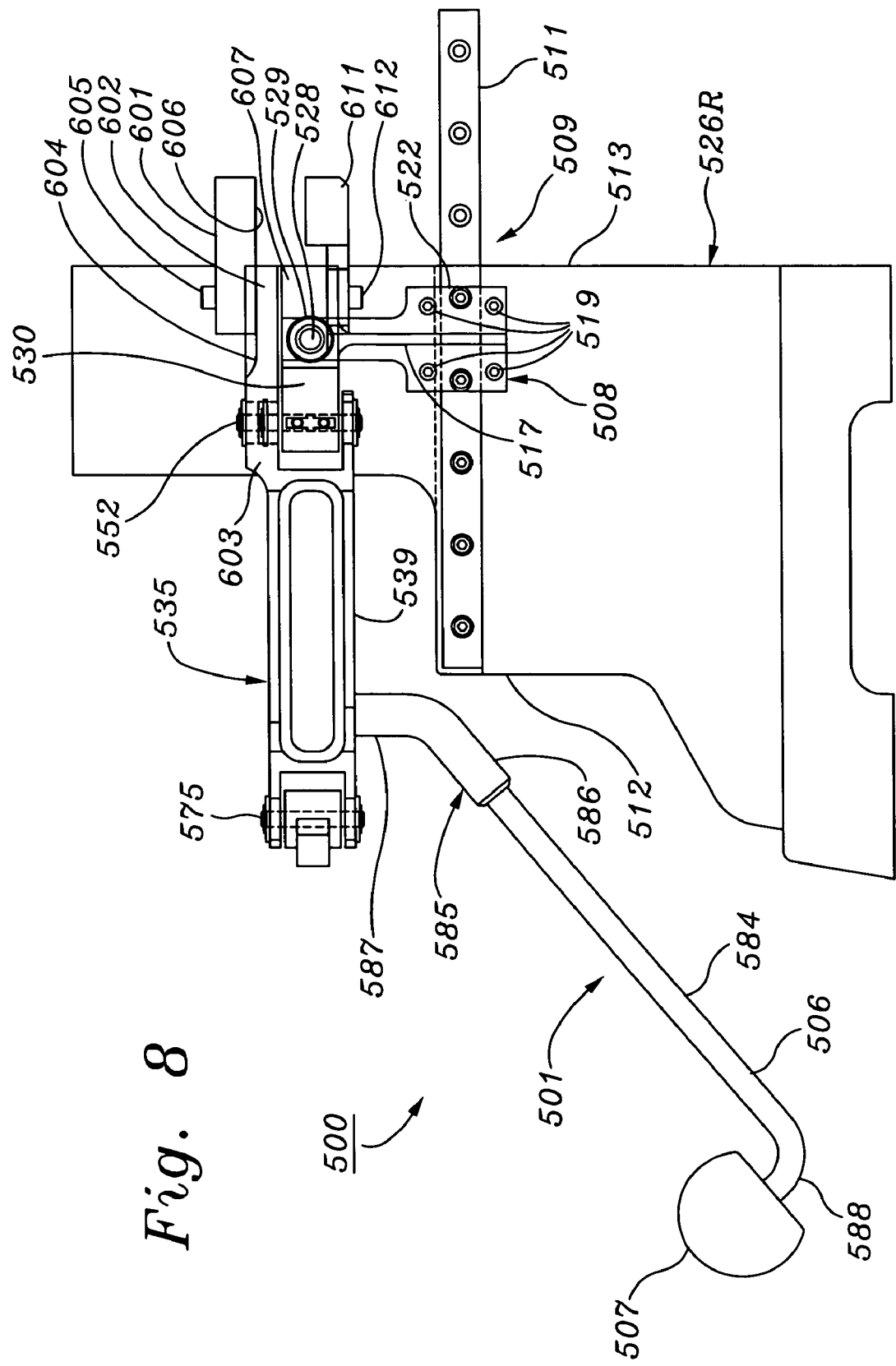
FIG. 8 is a right side elevation view of the apparatus of FIG. 6.

Referring to FIGS. 6-8, it may be seen that trolley block 508 includes a gusset plate 517 which is fastened to an outer vertical surface 518 of bearing block 514, by suitable means, such as four screws 519 arranged in a rectangular ring pattern, as shown in FIG. 8. Gusset plate 517 has a flat vertical face 520, and a web section 521 which protrudes upwardly from bottom edge wall 522 of the gusset plate, which is generally aligned with bottom horizontal face 523 of bearing block 514. As shown in FIGS. 6, 7 and 8, web section 521 of gusset plate 517 has in front elevation view a generally right triangularly-shaped central rib section 525, which is terminated near an upper end portion thereof by a triangular plan view cap plate 526. Cap plate 526 has protruding laterally outwards (to the right in FIG. 6) from an outer vertical wall surface 527 thereof a horizontally oriented, laterally outwardly disposed pivot axle 528.

Figure 12:
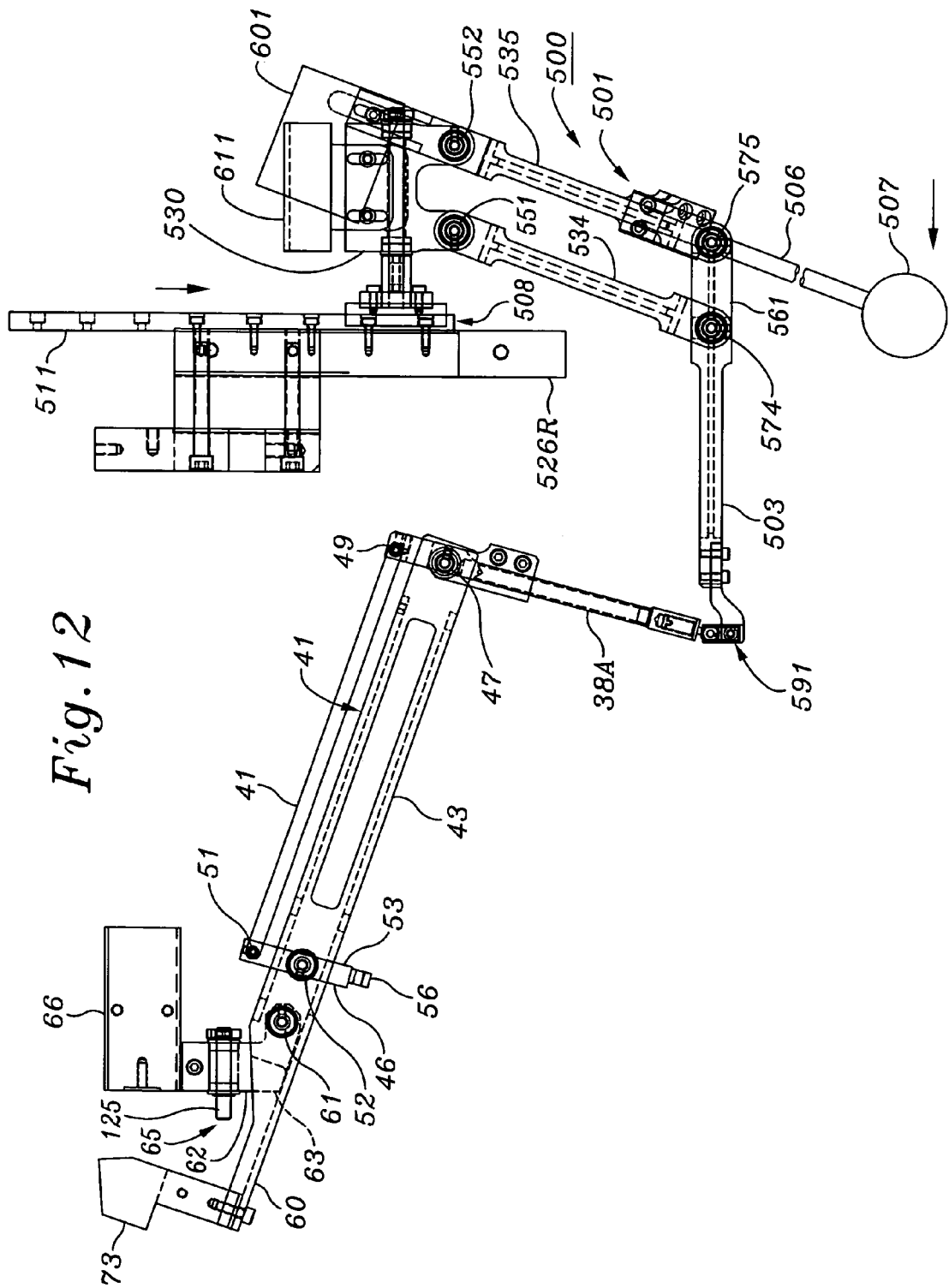
FIG. 12 is a view of the apparatus similar to that of FIG. 10, but showing a Y-axis trolley block thereof in a fully forward position.

As may be seen best by referring to FIGS. 6, 7 and 12, linkage assembly support pivot axle 528 is rotatably received in a bore 529 which is disposed transversely through a rectangularly-shaped block 530 that comprises a rear, lateral linkage bar of parallelogram linkage assembly 501. Rear lateral linkage bar 530 is retained on axle 528 by suitable means, as, for example, by a resilient C-shaped retainer ring 531 snapped into an annular groove 531A provided in cylindrical wall surface 532 of the axle, near outer end face 533 thereof.

Figure 13:
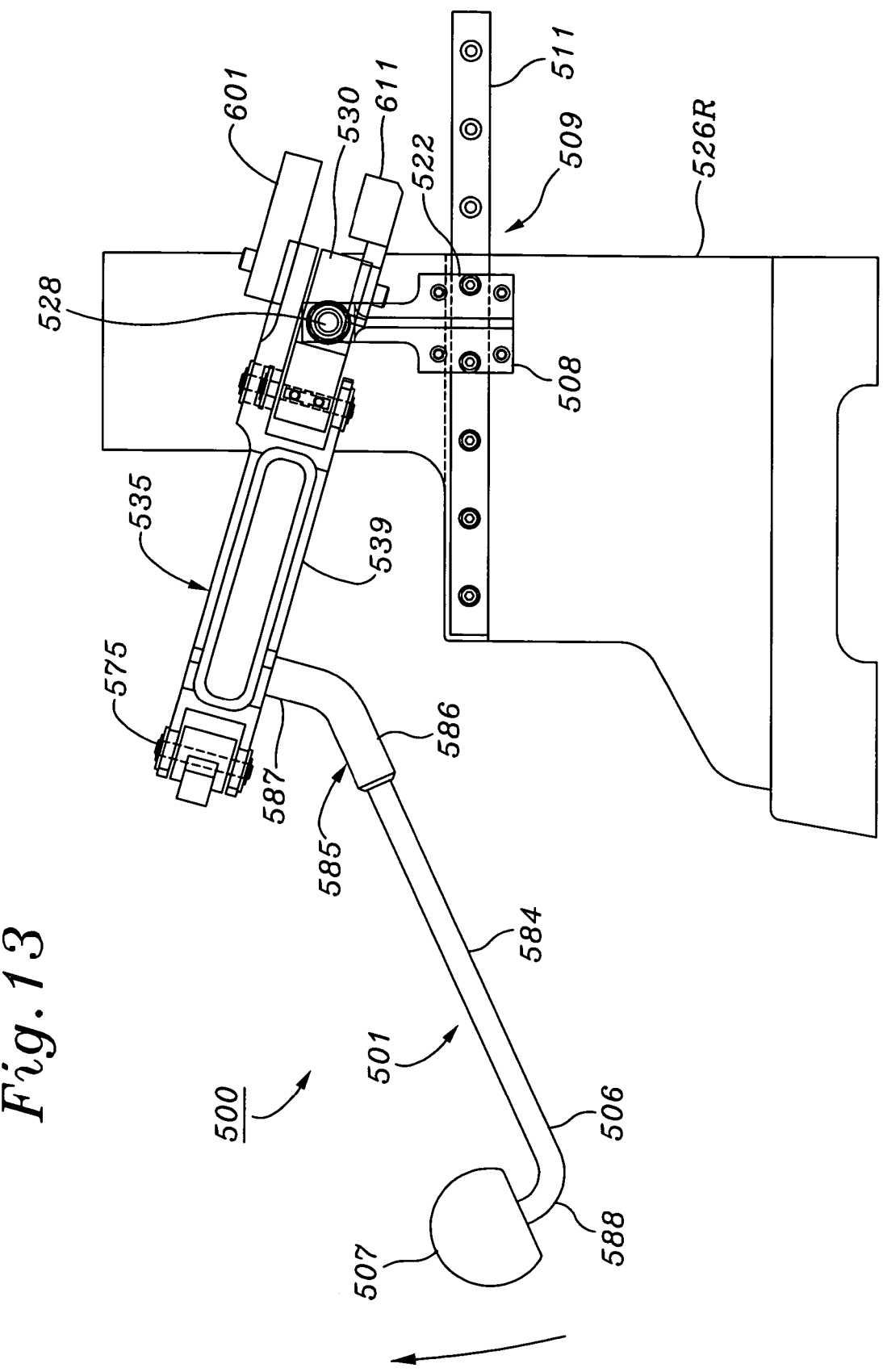
FIG. 13 is a right side elevation view of the apparatus similar to that of FIG. 8, showing a Y-axis trolley block and parallelogram linkage thereof in an intermediate longitudinal position and showing a hand control knob and control arm of the apparatus elevated to an upper limit to thereby tilt the linkage to a maximum elevation angle.

As shown in FIGS. 6-8, parallelogram linkage assembly 501 includes a pair of parallel, inner and outer, or left and right fore-and-aft disposed longitudinal linkage bars 534,535, respectively. Longitudinal linkage bars 534,535 have generally the shape of longitudinally elongated, hollow rectangular cross-section beams which have generally flat and parallel upper and lower surfaces 536,537,538,539, respectively. As shown in FIGS. 12 and 13, rear end portions 540,541 of left and right, inner and outer longitudinal linkage bars 534,535 are pivotably connected to rear lateral linkage bar 530. Thus, as shown in FIGS. 5-8 in addition to FIG. 12, rear lateral linkage bar 530 has disposed through upper and lower surfaces 542,543 of, near front vertical face 544 thereof, a pair of laterally spaced apart, left and right vertical rear pivot axle bores 545,546, respectively. Also, rear end portions 540,541 of left and right, inner and outer linkage bars 534,535 have near rear end faces 547,548, thereof vertically disposed rear pivot axle bores 549,550. The rear end portions 540,541 of linkage bars 534,535 are pivotably secured to rear lateral linkage bar 530 by left and right rear vertical pivot axles 551, 552, which are disposed downwardly through rear pivot axle bores 549, 550 of the longitudinal linkage bars, and thence through pivot axle bores 545,546, respectively, through the rear lateral linkage bar. Left and right rear vertical pivot axles 551, 552 are secured within bores through rear lateral linkage bar 530 and left and right longitudinal linkage bars 534,535 by suitable means, such as upper and lower left and right C-rings 553,554,555,556 snapped into annular grooves 557, 558,559,560 near upper and lower ends, respectively, of the left and right pivot axles.

Referring to FIG. 6, it may be seen that parallelogram linkage assembly 501 of auxiliary input control mechanism 500 includes a front transversely disposed lateral linkage bar 561 which is parallel to rear lateral linkage bar 530. Front lateral linkage bar 561 has parallel upper and lower surfaces 562,563, respectively, and comprises the fourth linkage bar of 4-bar parallelogram linkage assembly 501. Front lateral linkage bar 566 has disposed midway between front and rear lateral edges 564,565 thereof a pair of laterally spaced apart, left and right vertical pivot axle bores 566,567, respectively. Also, front end portions 568,569 of left and right, inner and outer longitudinal linkage bars 534,535 have therethrough near front end walls 570,571 thereof front pivot axle bores 572,573. The front end portions 568,569 of left and right longitudinal linkage bars 534,535 are pivotably secured to front lateral linkage bar 561 by left and right front vertical pivot axles 574,575 which are disposed downwardly through front pivot axle bores 572,573 of the longitudinal linkage bars, and thence through pivot axle bores 566,567 through the front lateral linkage bar. Left and right front pivot axles 574, 575 are secured within bores through front lateral linkage bar and left and right longitudinal linkage bars 534,535 by suitable means, such as upper and lower left and right C-rings 576,577,578,579 snapped into annular grooves 580,581,582, 583 near upper and lower ends of the left and right pivot axles.

As may be seen best by referring to FIGS. 6, 7 and 8, linkage assembly 501 has in a quiescent, or unmanipulated configuration the shape of a longitudinally elongated rectangular ring, the linkage bars of which have a common, generally horizontally disposed mid-plane.

Referring to FIGS. 6-8, it may be seen that hand control arm 507 has an elongated straight shaft section 584 which angles downwardly and forwardly from the lower end 586 of an obliquely downwardly and forwardly angled elbow coupler 585 of larger diameter. Elbow coupler 585 has a vertically disposed upper end portion 587 which is fastened to lower surface 539 of right-hand, outer longitudinal linkage bar 535, rearward of right front linkage assembly vertical pivot axle 575. Shaft 584 of hand control arm 507 also has a short front portion 588 which angles upwardly and forwardly from downwardly angled straight longer shaft section 584, at an angle of about 90 degrees. Hemispherically-shaped hand control knob 507 is mounted concentrically on the upper end of angled front shaft portion 588.

Referring to FIGS. 6 and 7, it may be seen that connector arm 503 which couples 4-bar parallelogram linkage assembly 501 of auxiliary control mechanism 500 to micro-manipulator 40 comprises essentially a continuous laterally inwardly protruding extension of front lateral linkage bar 561, leftward of inner, left-hand edge 506 of left longitudinal linkage bar 534. As may be seen best by referring to FIG. 6, front and rear parallel laterally disposed edge walls 589,590 of connector arm 503 are preferably recessed equal distances inwardly from front and rear lateral edge walls 587,588 of front lateral linkage bar 561, thus making the connector arm narrower and lighter in weight than the front linkage bar.

Figure 9:
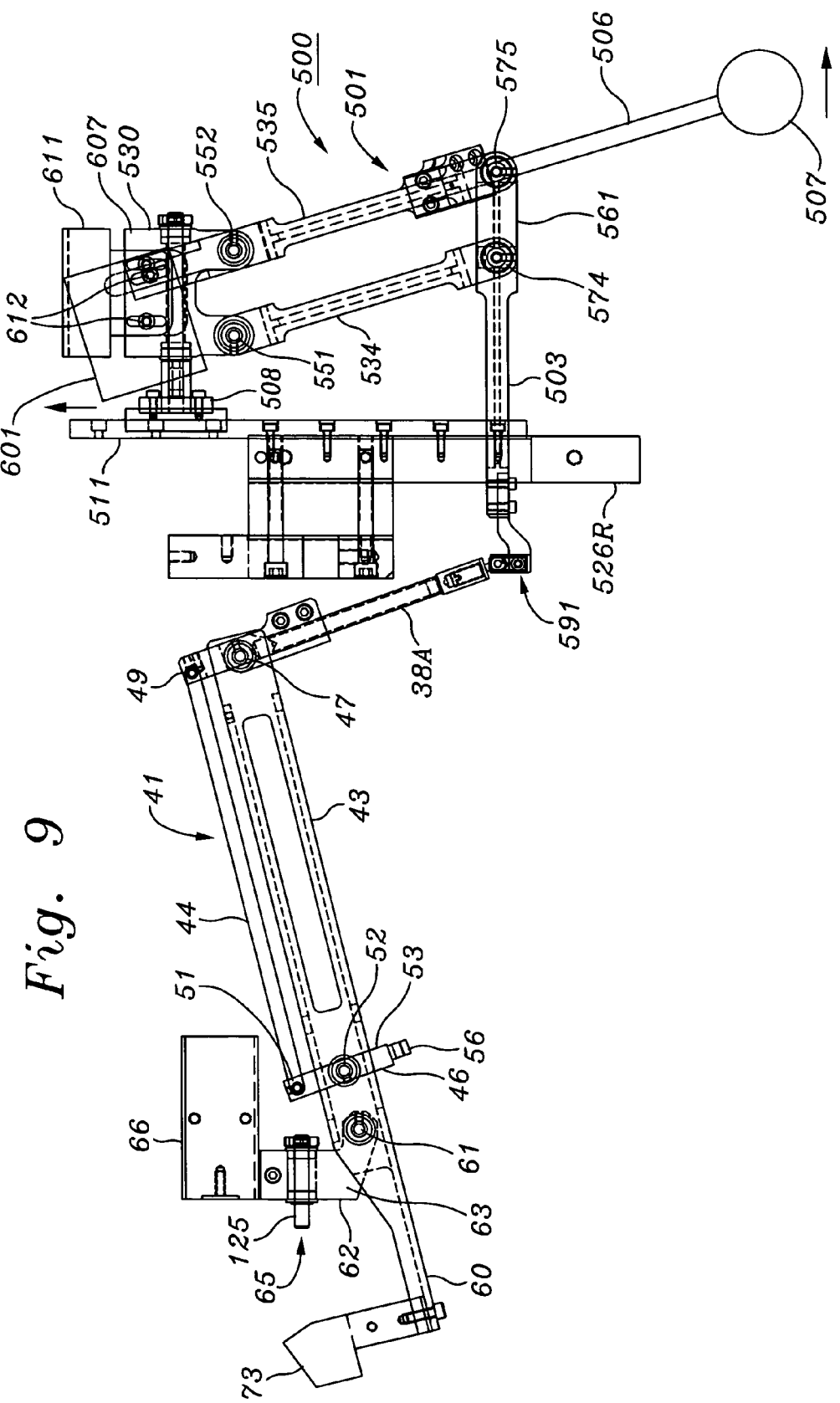
FIG. 9 is an upper plan view of the apparatus of FIG. 6, showing a Y-axis trolley block and parallelogram linkage assembly of a motion control mechanism thereof in a fully rearward, minus Y position, and showing a hand control knob of the linkage assembly manipulated to a maximum right-hand, plus X direction.
Figure 10:
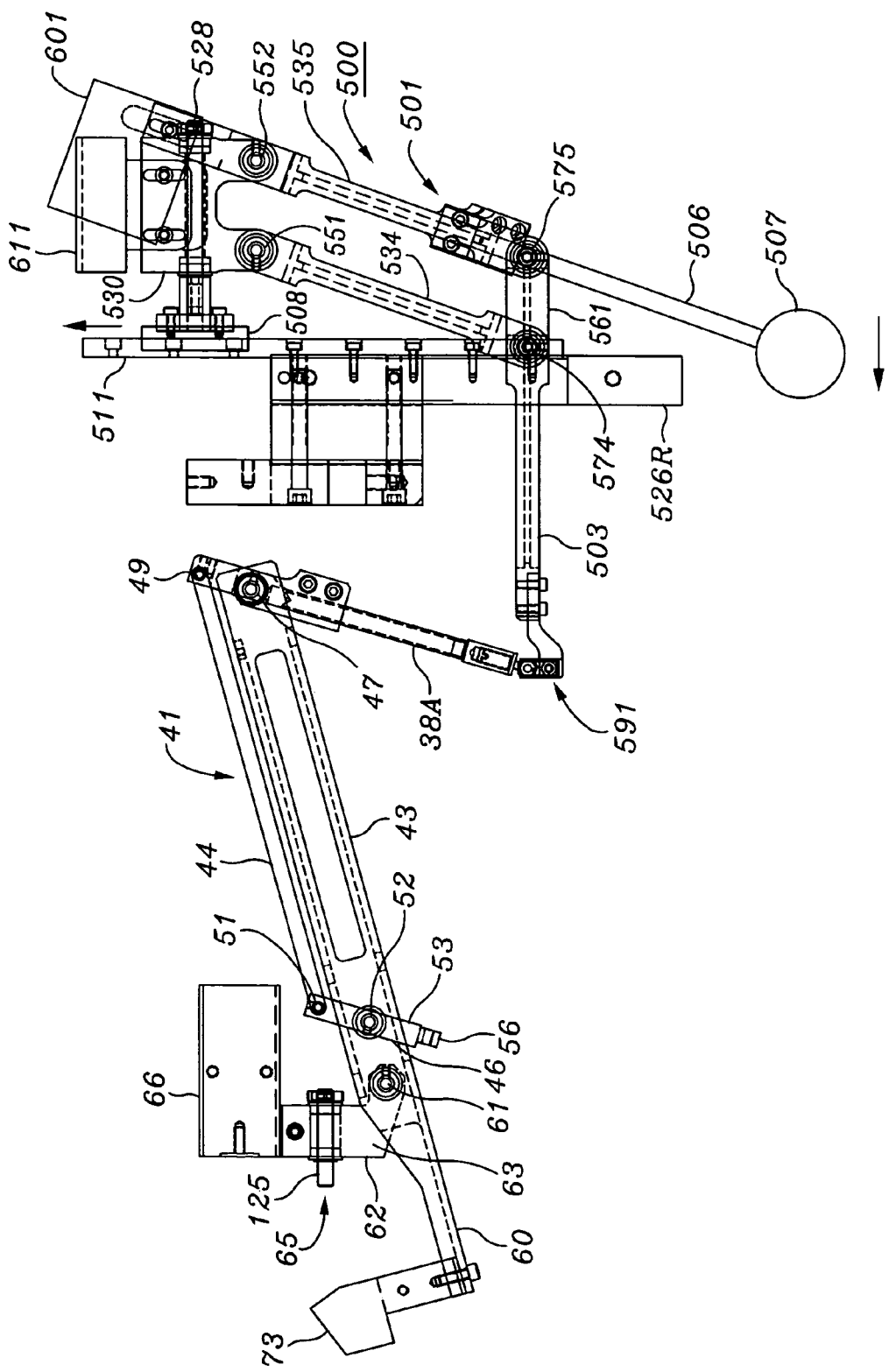
FIG. 10 is a view similar to that of FIG. 9, but showing a control knob of the motion control mechanism of the apparatus manipulated to a left-hand, minus X limit.
Figure 11:
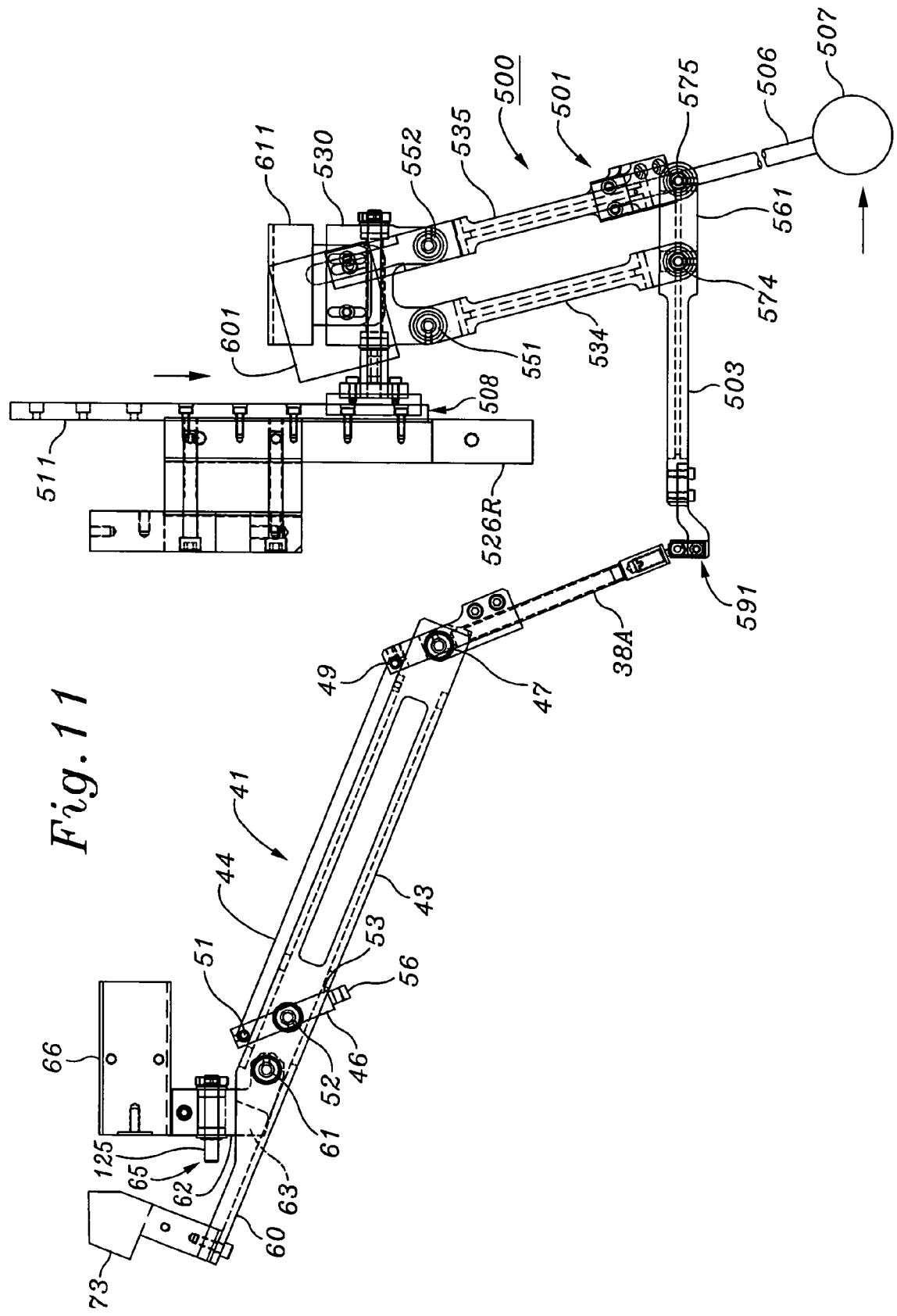
FIG. 11 is a view similar to that of FIG. 9, showing a Y-axis trolley block and parallelogram linkage assembly thereof in a fully forward position.

Referring primarily to FIG. 6, it may be seen that inner lateral end 504 of connector arm 503 is pivotably coupled to a forward end portion of longitudinally disposed input control member 38A of micro-manipulator 40, by means of an adapter coupling joint 591. Adapter coupler joint 591 has a generally laterally disposed dog-leg plan view horizontal plate section 592 which is pinned at a laterally outwardly located end thereof to lateral inner end 504 of connector arm 503, as for example by a pair of longitudinally rearwardly disposed, laterally spaced apart left and right screws 593L, 593R. Adapter coupling joint 591 also has through plate section 592 thereof, at an inner lateral end thereof, a vertically disposed coupler pivot axle 594, which is pivotably joined to a longitudinally forwardly protruding, cylindrically-shaped boss 595 that is secured within a blind bore 596 provided in front cylindrical end face 597 of micro-manipulator input control arm 38A. Thus constructed, adaptor coupling joint 591 enables input control arm 38A of micro-manipulator 40 to be slaved to longitudinally inward/outward, minus, plus Y directions, as shown in FIGS. 9 and 10, and to laterally left/right, minus plus X directions, as shown in FIGS. 11, 12 and 13. Moreover, when hand control knob 507 is moved up/down in plus/minus Z directions as shown in FIGS. 8 and 14, the inclination angle of the plane of the 4-bar parallelogram linkage of assembly of micro-manipulator, which is held to co-planar with the plane of parallelogram linkage assembly 501 of auxiliary controller apparatus 500, is tilted the same amount.

As shown in FIGS. 6-8 and 12, auxiliary control apparatus 500 includes a laterally elongated, generally rectangularly block-shaped counterweight 601 which is attached to a reduced width, thickened web 602 extension of upper plate portion 603 of right-hand, outer longitudinal linkage bar 535. Web extension 602 of outer longitudinal linkage bar 535 protrudes rearwardly of right rear pivot axle 552. Counterweight 601 is fastened to upper surface 604 of linkage bar extension 602 by suitable means, such as screws 605.

As shown in FIGS. 8 and 13, counterweight 601 has a flat lower surface 606 which is spaced above upper surface 607 of rear lateral linkage bar 530. The primary purpose of counterweight 601 is to provide, during lateral motions of control knob 507, inertial balancing of the weight of components of micro-positioner 40 coupled to parallelogram linkage assembly 501 at locations clockwise of right rear pivot axle 552, thus affording a dynamically neutral feel to lateral movements of hand control knob 507.

As may be seen best by referring to FIGS. 8 and 9, parallelogram linkage assembly 501 of auxiliary controller apparatus 500 also includes a rectangular block-shaped Z-axis counterweight 611 which is attached to an upper surface of rear lateral linkage bar 530 by screws 612, at a location rearward of linkage assembly support axle 528. Since counterweight 611 is located rearward of linkage assembly support axle 528 which protrudes horizontally outwards from trolley block 508, the product of gravitational force acting on the counterweight times the distance of its longitudinal mass center line rearward from the center line of axle 520 exerts a clockwise torque about the axle center line, on parallelogram linkage assembly 501. The mass of counterweight 611 and the location of its center of mass rearward of the center line of pivot support axle 520 are selected to produce a torque equal to a counterclockwise torque exerted around axle 528 by those components of linkage assembly 501 located forward of the axle. Thus, vertical positions of hand control knob 507 and tool tip 36 are maintained at neutral rest positions, which may be biased downwardly by a small counterclockwise moment exerted by parallelogram linkage assembly 501 and micro-positioner 40 to which apparatus is connected, countered by a clockwise torque exerted by spring 75 and adjusted by adjustment screw 76.

As may be understood by referring to FIGS. 1-5 in conjunction with FIGS. 6-13, motions in a third coordinate system of hand control knob 507 of auxiliary control apparatus 500 in (fore-and-aft) left and right, lateral directions (minus/plus X-axis translational), longitudinal, or fore-and-aft directions (plus minus Y directions), and up and down vertical directions (plus/minus Z directions), causes output arm 53 of pantograph manipulator input mechanism of micro-manipulator apparatus 40 to be translated in a first coordinate system in the same directions and in the same scaled ratios as would be achieved by manipulation in a second coordinate system of original hand control knob 37 of micro-manipulator apparatus 40. Motions of output arm 53 coupled through ball joint 56 to tool support plate 59 in turn cause tool tip 36 of ultrasonic bonding machine 20 to be translated in the same direction and the same scaled ratios as would be achieved by manipulation of hand control knob 37. Moreover, as may be seen by referring to FIGS. 1, 3 and 6, control of motions of bonding tool tip 36 using auxiliary control apparatus 500 is effected by hand control knob 507 located a substantially larger lateral distance L5 from bonding tool tip 36 than the original distance L4 between the tool tip and hand control knob 37 of a micro-manipulator apparatus 40 not coupled to the auxiliary control apparatus. Therefore, coupling auxiliary control apparatus 500 to bonding machine 20 expands the useable lateral work space in front of bonding machine 20 and below tip 38 of ultrasonic bonding tool 34 from an original width of L4 to a substantially larger width L5, e.g., from 1 foot to 2 feet.

Summarizing functions of auxiliary control apparatus 500 according to the present invention, motions in a third coordinate system of auxiliary hand control knob 507 of the apparatus effect motions in a second coordinate system at the end of a shortened micro-manipulator input mechanism control 38A in a second coordinate system, which in turn effects motion in a first coordinate system of the tip 36A of tool attached to tool support plate 59. In a preferred embodiment, the lengths of each of the four linkage bars of parallelogram linkage assembly 501 of apparatus 500, are chosen so that motions of tool tip 36A in a first coordinate system are in the same ratios to motions of control knob 507 in a third coordinate system as motions of the tool tip to motions of deleted hand control knob 37 in a second coordinate system.

As stated above, a preferred embodiment of auxiliary control apparatus 500 is constructed in a manner which enables remote positioning of tool tip 36A in three orthogonal directions of a first coordinate system by corresponding motions of auxiliary apparatus hand control knob 507 in three orthogonal directions in a third coordinate system. Thus, left/right, lateral motions of tool tip 36A are effected by moving auxiliary hand control knob left/right in an "X" direction. Fore/aft motions of tool tip 36A are effected by translations of hand control knob 507 forward/backward in plus/minus Y directions. Up/Down motions of tool tip 36A are effectively moving auxiliary hand control knob 507 up/down in plus/minus Z directions, thus tilting the plane of linkage assembly 501.

Alternate embodiments of the auxiliary control apparatus according to the invention for effecting motions of a tool or other implement in less than three coordinate directions are possible. Thus, replacing pivot joint 510 by a fixed joint disables up/down Z motions, while enabling X and Y motions, replacing bearing assembly 509 by a fixed mounting disables fore/aft plus/minus Y motions, while enabling X and Z motions, and replacing front and rear parallelogram axle joints with fixed joints disables left/right, lateral minus/plus X motions, while enabling Y and Z axis motions.

What is claimed is:

1. An auxiliary control apparatus for coupling to an input control member of a micro-manipulator of a type which has a manipulator input mechanism that is mechanically coupled to an output follower mechanism and which is used to precisely position relative to a workpiece a tip of a tool mounted on the follower mechanism, by effecting motions of an output member of said follower mechanism to which said tool is mounted in scaled ratios of motions of said input control member of said manipulator input mechanism, said apparatus comprising;
   a. a motion control mechanism which includes a moveable input control arm and an output connector member,
   b. a support assembly for supporting said motion control mechanism by a structural support member for a micro-manipulator, and
   c. a coupler assembly for pivotably coupling said output connector member of said motion control mechanism to an input control member of said micro-manipulator, whereby motions of said input control member of said apparatus effect corresponding motions of said input control member of said micro-manipulator, and thereby effect motions of an output member of said micro-manipulator to which a tool is mountable.

2. The apparatus of claim 1 wherein said input control arm of said apparatus has at an end thereof an input control knob.

3. The apparatus of claim 2 wherein motions of said tool effected by motions of said knob of said input control arm are ratios thereof which are equal to ratios of motions of said tool tip effected by motions of a hand control knob which originally terminated said input control member of said micro-manipulator.

4. The apparatus of claim 1 wherein said motion control mechanism of said apparatus is further defined as including a 4-bar linkage assembly.

5. The apparatus of claim 4 wherein said 4-bar linkage assembly is further defined as including four linkage bars arranged in a parallelogram-shaped ring.

6. The apparatus of claim 5 wherein said support assembly for supporting said motion control mechanism is further defined as enabling translational motion of said linkage assembly relative to said structural support member for said micro-manipulator.

7. The apparatus of claim 6 wherein said support assembly is further defined as enabling pivotable motion of said linkage assembly relative to said structural support member.

8. The apparatus of claim 5 wherein said support assembly is further defined as enabling pivotable motion of said linkage assembly relative to said structural support member.

9. The apparatus of claim 8 wherein said support assembly is further defined as enabling translational motion of said linkage assembly relative to said structural support member for said micro-manipulator.

10. The apparatus of claim 5 wherein said linkage assembly is further defined as including a rear lateral linkage bar which is disposed laterally outwards of said structural support member and said tool.

11. The apparatus of claim 10 wherein said linkage assembly is further defined as including a pair of parallel left and right longitudinally disposed longitudinal linkage bars coupled at rear ends thereof by left and right rear pivot axles to said rear lateral linkage bars, and a front lateral linkage bar coupled at left and right ends thereof by left and right front pivot axles to front end portions of said left and right longitudinal linkage bars.

12. The apparatus of claim 11 wherein said four linkage bars of said linkage assembly have a common mid-plane.

13. The apparatus of claim 12 wherein said output connector member of said motion control assembly is further defined as being said front laterally disposed linkage bar of said linkage assembly.

14. The apparatus of claim 13 wherein said connector arm is further defined as being an extension of said front lateral extension bar which is parallel to and extends laterally inwardly to the left of said left front pivot axle.

15. The apparatus of claim 14 wherein said coupler assembly is further defined as including at an inner lateral end of said connector arm an adapter coupler pivot joint coupleable to an outer, front end of a micro-manipulator input arm in a manner enabling pivotable motion of said micro-manipulator input control arm relative to said connector arm in a plane parallel to said mid-plane of said motion control mechanism.

16. An auxiliary control apparatus for coupling to an input control member of a micro-manipulator of a type which has a manipulator input mechanism that is mechanically coupled to an output follower mechanism and which is used to effect motions relative to a workpiece of a tip of a tool mounted to an output member of said follower mechanism, said motions of said tool tip being predetermined fractions of corresponding motions of an input point of an input control member of said manipulator input mechanism, said apparatus comprising;
   a. an input motion control mechanism which comprises a 4-bar parallelogram linkage assembly that has an input control arm fastened to one linkage bar thereof, and an output connector member fastened to another linkage bar thereof,
   b. a support mount for supporting said linkage assembly by a structural support member for a micro-manipulator, and
   c. a coupler assembly for pivotably coupling said output connector member of said linkage assembly to an input control member of said micro-manipulator; whereby motions of said input control member of said apparatus effect corresponding motions of said input control member of said micro-manipulator and thereby effect motions of an output member of said micro-manipulator to which a tool is mountable.

17. The apparatus of claim 16 wherein said linkage assembly is further defined as including a laterally disposed rear lateral bar and a pair of parallel left and right fore-and-aft disposed longitudinal bars pivotally connected at rear end portions thereof to said rear lateral linkage bar by parallel left and right rear axle pins disposed perpendicularly to said longitudinal bars and said rear lateral bar, and a front lateral bar disposed parallel to said rear lateral bar and pivotably connected at left and right end portions thereof to said left and right longitudinal linkage bars by left and right front axle pins disposed parallel to said rear axle pins.

18. The apparatus of claim 17 wherein said input control arm of said linkage assembly is further defined as being attached to said outer, right-hand longitudinal linkage bar and protruding forward of said front lateral linkage bar.

19. The apparatus of claim 18 wherein said output connector member is further defined as being a connector arm which is an extension of said front lateral bar and which is parallel to and protruding laterally inwardly of said left front axle pins.

20. The apparatus of claim 19 wherein said coupler assembly is further defined as including an adapter coupling pivot joint for pivotably joining a laterally inwardly located end of said connector arm to a longitudinally forward end of said input control arm of said micro-manipulator.

21. The apparatus of claim 20 wherein said pivot joint is further defined as enabling relative pivotable motion between said connector arm and said input control arm of micro-manipulator in a plane parallel to a longitudinally disposed mid-plane of said motion control mechanism.

22. The apparatus of claim 21 wherein said support mount for supporting said linkage assembly by a structural support member for said micro-manipulator is further defined as being attached to said rear lateral linkage bar.

23. The apparatus of claim 22 wherein said support mount is further defined as enabling fore-and-aft translational motion of said rear lateral linkage bar.

24. The apparatus of claim 23 wherein said support mount is further defined as enabling pivotable motion of said rear lateral linkage bar about a laterally disposed horizontal axis.

25. The apparatus of claim 24 wherein said pivot joint of said coupler assembly is further defined as enabling relative pivotable motion between said connector arm and said input control arm of said micro-manipulator only in a plane parallel to a longitudinally disposed mid-plane of said motion control mechanism.

26. The apparatus of claim 22 wherein said support mount is further defined as enabling pivotable motion of said rear lateral linkage bar about a laterally disposed horizontal axis.

27. The apparatus of claim 26 wherein said support mount is further defined as enabling fore-and-aft translational motion of said rear lateral linkage bar.

28. The apparatus of claim 27 wherein said pivot joint of said coupler assembly is further defined as enabling relative pivotable motion between said connector arm and said input control arm of said micro-manipulator only in a plane parallel to a longitudinally disposed mid-plane of said motion control mechanism.

29. The apparatus of claim 28 wherein motions of said tool tip in orthogonal directions of a first coordinate system are in a first set of predetermined ratios RX1, RY1, RZ1 of motions in a second coordinate system of said input point of said input control member of said manipulator mechanism.

30. The apparatus of claim 29 wherein motions in said second coordinate system of said input point of said input control member of said manipulator mechanism are in a second set of ratios of RX2, RY2, RZ2 of corresponding motions in a third coordinate system of an input point of said input control arm of said apparatus.

31. The apparatus of claim 30 wherein respective axes of said second and third coordinate systems are parallel.

32. The apparatus of claim 31 wherein said ratios RX2, RY2, RZ2 are all equal to one, whereby ratios of motions of said tool tip to motions of said input point of said input control arm of said apparatus are equal to ratios of motion of said tool tip to motions of said input point of said input control member of said manipulator input mechanism.

33. An auxiliary control apparatus for coupling to an input control member of a micro-manipulator of a type which has a manipulator input mechanism that is mechanically coupled to an output follower mechanism and which is used to effect motions relative to a workpiece of a tip of a tool mounted to an output member of said follower mechanism which are predetermined fractions of corresponding motions of an input point of an input control member of said manipulator input mechanism, said apparatus comprising;
   a. an input motion control mechanism which comprises a linkage assembly that has an input control arm fastened to a first part of said linkage assembly, and an output connector member fastened to another part of said linkage assembly,
   b. a support mount for supporting said linkage assembly by a structural support member for a micro-manipulator, and
   c. a coupler assembly for pivotably coupling said output connector member of said linkage member to an input control member of said micro-manipulator; whereby motions of said input control member of said apparatus effect corresponding motions of said input control member of said micro-manipulator, and thereby effect motions of an output member of said micro-manipulator to which a tool is mountable.

34. The apparatus of claim 33 wherein said input control member of said micro-manipulator is located on a first, laterally inward side of said structural support member.

35. The apparatus of claim 34 wherein said input control member of said micro-manipulator is further defined as being disposed in a longitudinal, generally fore-and-aft direction adjacent to said laterally inward side of said structural support member.

36. The apparatus of claim 35 wherein said linkage assembly is further defined as being located on a second, outward side of said structural support member.

37. The apparatus of claim 36 wherein said input control arm is further defined as being disposed in a longitudinal, generally fore-and-aft direction from said linkage assembly and spaced outwards from said outward side of said structural support member.

38. The apparatus of claim 37 wherein said output connector member is further defined as protruding laterally inwardly of said structural support member, said output connector member having an inner lateral end pivotably coupled by said coupler assembly to a forward end of said input control member of said micro-manipulator.

39. The apparatus of claim 38 wherein said support mount for supporting said linkage assembly by said structure support member is further defined as enabling fore-and-aft, Y axis translational motions of said linkage assembly in response to fore-and-aft forces exerted on a hand control knob which terminates a front end portion of said input control arm.

40. The apparatus of claim 39 wherein said support mount is further defined as including a laterally outwardly protruding pivot axle pivotably mounting said linkage assembly, thereby enabling pivotable motion of said control knob, control arm, connector arm, and micro-manipulator input member in up/down, plus/minus Z-axis directions.

41. The apparatus of claim 38 wherein said support mount for supporting said linkage assembly by said structural support member is further defined as including a laterally outwardly protruding pivot axle pivotably mounting said linkage assembly.

42. The apparatus of claim 38 wherein said linkage assembly is further defined as being a 4-bar parallelogram type including a rear laterally disposed rear lateral linkage bar, a pair of left and right, inner and outer, fore-and-aft disposed longitudinal linkage bars pivotably connected at rear end portions thereof to said rear lateral linkage bar by parallel left and right rear axle pins disposed perpendicularly to a common mid-plane of said longitudinal bars and said rear lateral bar, and a front lateral linkage bar disposed parallel to said rear lateral linkage bar, and pivotably connected at inner and outer, left and right end portions thereof to front end portion of said left and right, inner and outer longitudinal linkage bars by left and right front axle pins disposed parallel to said rear axle pins, thereby enabling laterally inwardly and outwardly, left and right directed forces exerted on said hand control knob of said input control arm to distort a plan-view shape of said linkage assembly from a neutral, rectangular ring-shape to a non-rectangular parallelogram shape, thereby translating said connector arm, coupler assembly, and input control member of said micro-manipulator in laterally inwardly and outwardly left and right, minus/plus X-axis directions.

43. The apparatus of claim 42 wherein said support mount for supporting said linkage assembly by said structure support member is further defined as enabling fore-and-aft, Y axis translational motions of said linkage assembly in response to fore-and-aft forces exerted on a hand control knob which terminates a front end portion of said input control arm.

44. The apparatus of claim 42 wherein said support mount is further defined as including a laterally outwardly protruding pivot axle pivotably mounting said linkage assembly, thereby enabling pivotable motion of said control knob, control arm, connector arm, and micro-manipulator input member in up/down, plus/minus Z-axis directions.

45. The apparatus of claim 43 wherein said support mount is further defined as including a laterally outwardly protruding pivot axle pivotably mounting said linkage assembly, thereby enabling pivotable motion of said control knob, control arm, connector arm, and micro-manipulator input member in up/down, plus/minus Z-axil directions.

* * * * *